(12) United States Patent
Tang

(10) Patent No.: US 8,175,191 B2
(45) Date of Patent: May 8, 2012

(54) COMBINED SENSING METHODS FOR COGNITIVE RADIO

(75) Inventor: Haiyun Tang, Saratoga, CA (US)

(73) Assignee: Adaptrum, Inc., Milpitas, CA (US)

( * ) Notice: Subject to any disclaimer, the term of this patent is extended or adjusted under 35 U.S.C. 154(b) by 1053 days.

(21) Appl. No.: 12/070,831

(22) Filed: Feb. 20, 2008

(65) Prior Publication Data

US 2008/0198948 A1 Aug. 21, 2008

Related U.S. Application Data

(60) Provisional application No. 60/890,801, filed on Feb. 20, 2007.

(51) Int. Cl.
*H03K 9/00* (2006.01)
(52) U.S. Cl. ........................................................ 375/316
(58) Field of Classification Search .................. 375/316
See application file for complete search history.

(56) References Cited

U.S. PATENT DOCUMENTS

| | | | |
|---|---|---|---|
| 5,457,813 A | 10/1995 | Poutanen | |
| 5,574,990 A | 11/1996 | Flanagan | |
| 6,252,898 B1 * | 6/2001 | Eto et al. ........................ | 375/130 |
| 6,252,912 B1 | 6/2001 | Salinger | |
| 6,266,517 B1 | 7/2001 | Fitzpatrick et al. | |
| 6,334,047 B1 | 12/2001 | Andersson et al. | |
| 6,420,873 B1 * | 7/2002 | Guthrie .......................... | 324/322 |
| 6,512,917 B1 | 1/2003 | Hiramatsu | |
| 1,298,464 A1 | 3/2003 | Blumerberg | |
| 6,628,956 B2 | 9/2003 | Bark et al. | |
| 6,658,045 B1 | 12/2003 | Jin | |
| 6,701,134 B1 | 3/2004 | Epperson | |
| 6,738,584 B1 * | 5/2004 | Tsuda et al. .................... | 398/147 |
| 6,771,957 B2 | 8/2004 | Chitrapu | |
| 2002/0080730 A1 * | 6/2002 | LeBlanc ......................... | 370/286 |
| 2003/0003914 A1 * | 1/2003 | Kubo et al. ..................... | 455/441 |
| 2003/0007548 A1 | 1/2003 | Nagano | |
| 2003/0114127 A1 * | 6/2003 | Baldwin ....................... | 455/245.1 |
| 2004/0263378 A1 * | 12/2004 | Jossef et al. ...................... | 342/20 |
| 2005/0063386 A1 * | 3/2005 | Owen et al. ..................... | 370/392 |
| 2005/0164708 A1 * | 7/2005 | Gabriel et al. ................ | 455/452.2 |
| 2005/0276411 A1 * | 12/2005 | LeBlanc ................... | 379/406.05 |
| 2006/0209985 A1 | 9/2006 | Kang | |
| 2006/0256884 A1 | 11/2006 | Tomioka et al. | |

FOREIGN PATENT DOCUMENTS

KR 2002-0045866 A1 6/2002

(Continued)

OTHER PUBLICATIONS

ATSC, "Digital Television Standard", Aug. 7, 2001, Publisher: ATSC, Published in: USA.

(Continued)

*Primary Examiner* — Juan A Torres
(74) *Attorney, Agent, or Firm* — West & Associates, A PC; Stuart J. West; Ted A. Marsh

(57) ABSTRACT

Embodiments of cognitive radio technology can recover and utilize under-utilized portions of statically-allocated radio-frequency spectrum. A plurality of sensing methods can be employed. Transmission power control can be responsive to adjacent channel measurements. Digital pre-distortion techniques can enhance performance. Embodiments of a high dynamic range transceiver architecture can be employed.

8 Claims, 22 Drawing Sheets

FOREIGN PATENT DOCUMENTS

KR  10-2005-0116863 A1  2/2005

OTHER PUBLICATIONS

FCC, "Facilitating opportunities for flexible, efficient, and reliable spectrum use employing cognitive radio technologies", Dec. 30, 2003, Publisher: FCC.

FCC, "Report of The Spectrum Efficency Working Group", Nov. 15, 2002, Publisher: FCC.

Joseph Mitola III, "Cognitive radio for flexible mobile multimedia communications", "Mobile Multimedia Communications, 1999. (MoMuC '99) 1999 IEEE International Workshop on", Sep. 1999, Publisher: IEEE.

Pawelczak et al., "Cognitive Radio Emergency Networks Requirements and Design", "New Frontiers in Dynamic Spectrum Access Networks, 2005. DySPAN 2005. 2005 First IEEE International Symposium on", Nov. 2005, pp. 601-606, Publisher: IEEE.

FCC, "FCC first report and order: Revision of part 15 of the commission's rules regarding ultra-wideband transmission systems", Feb. 14, 2002, Publisher: FCC.

Federal Communications Commission, "Notice of Proposed Rule Making", May 25, 2004, Publisher: Federal Communications Commission.

* cited by examiner

COMBINED SENSING METHODS FOR COGNITIVE RADIO

PRIORITY

This application is related to and claims priority under 35 U.S.C. 119(e) to U.S. Provisional Patent Application No. 60/890,801 filed on Feb. 20, 2007 entitled "SYSTEM AND METHOD FOR COGNITIVE RADIO" by Haiyun Tang the complete content of which is hereby incorporated by reference.

STATEMENT REGARDING FEDERALLY SPONSORED RESEARCH AND DEVELOPMENT

This invention was made with Government support under contract FA8750-05-C-0067 awarded by the Air Force. The Government has certain rights in the invention.

BACKGROUND

1. Field of the Invention

The inventions herein described relate to systems and methods for cognitive radio.

2. Description of the Related Art

Spectrum Utilization Problems

A recent study by the FCC Spectrum Task Force [United States' Federal Communications Commission (FCC), "Report of the spectrum efficiency working group," November 2002] found that while the available spectrum becomes increasingly scarce, the assigned spectrum is significantly underutilized. This imbalance between spectrum scarcity and spectrum underutilization is especially inappropriate in this Information Age, when a significant amount of spectrum is needed to provide ubiquitous wireless broadband connectivity, which is increasingly becoming an indispensable part of everyday life.

Static spectrum allocation over time can also result in spectrum fragmentation. With lack of an overall plan, spectrum allocations in the US and other countries over the past several decades can appear to be random. Despite some efforts to serve best interests at the time, this leads to significant spectrum fragmentation over time. The problem is exacerbated at a global level due to a lack of coordinated regional spectrum assignments. In order to operate under such spectrum conditions, a device can benefit from operational flexibility in frequency and/or band shape; such properties can help to maximally exploit local spectrum availability.

To address the above problems, an improved radio technology is needed that is capable of dynamically sensing and locating unused spectrum segments, and, communicating using these spectrum segments while essentially not causing harmful interference to designated users of the spectrum. Such a radio is generally referred to as a cognitive radio, although strictly speaking, it may perform only spectrum cognition functions and therefore can be a subtype of a broad-sense cognitive radio [J. M. III, "Cognitive radio for flexible mobile multimedia communications," *Mobile Networks and Applications*, vol. 6, September 2001.] that learns and reacts to its operating environment. Key aspects of a cognitive radio can include: Sensing: a capability to identify used and/or unused segments of spectrum. Flexibility: a capability to change operating frequency and/or band shape; this can be employed to fit into unused spectrum segments. Non-Interference: a Capability to Avoid Causing Harmful Interference to Designated Users of the Spectrum.

Such a cognitive radio technology can improve spectrum efficiency by dynamically exploiting underutilized spectrum, and, can operate at any geographic region without prior knowledge about local spectrum assignments. It has been an active research area recently.

FCC Spectrum Reform Initiatives

FCC has been at the forefront of promoting new spectrum sharing technologies. In April 2002, the FCC issued an amendment to Part 15 rules that allows ultra-wideband (UWB) underlay in the existing spectrum [FCC, "FCC first report and order: Revision of part 15 of the commission's rules regarding ultra-wideband transmission systems," ET Docket No. 98-153, April 2002]. In June 2002, the FCC established a Spectrum Policy Task Force (SPTF) whose study on the current spectrum usage concluded that "many portions of the radio spectrum are not in use for significant periods of time, and that spectrum use of these 'white spaces' (both temporal and geographic) can be increased significantly". SPTF recommended policy changes to facilitate "opportunistic or dynamic use of existing bands." In December 2003, FCC issued the notice of proposed rule making on "Facilitating Opportunities for Flexible, Efficient and Reliable Spectrum Use Employing Cognitive Radio Technologies" [FCC, "Facilitating opportunities for flexible, efficient, and reliable spectrum use employing cognitive radio technologies," ET Docket No. 03-108, December 2003] stating that "by initiating this proceeding, we recognize the importance of new cognitive radio technologies, which are likely to become more prevalent over the next few years and which hold tremendous promise in helping to facilitate more effective and efficient access to spectrum."

While both UWB and cognitive radio are considered as spectrum sharing technologies, their approaches to spectrum sharing are substantially different. UWB is an underlay (below noise floor) spectrum sharing technology, while cognitive radio is an overlay (above noise floor) and interlay (between primary user signals) spectrum sharing technology as shown in FIG. 1. Through sensing combined with operational flexibility, a cognitive radio can identify and make use of spectral "white spaces" between primary user signals. Because a cognitive user signal resides in such "white spaces", high signal transmission power can be permitted as long as signal power leakage into primary user bands does not embody harmful interference.

Broadcast TV Bands

Exemplary broadcast TV bands are shown in Graph 200 of FIG. 2. Each TV channel is 6 MHz wide. Between 0 and 800 MHz, there are a total of 67 TV channels (Channels 2 to 69 excluding Channel 37 which is reserved for radio astronomy). The NPRM [FCC, May 2004, op. cit.] excludes certain channels for unlicensed use: Channels 2-4, which are used by TV peripheral devices, and Channels 52-69, which are considered for future auction. Among the channels remaining, Channels 5-6, 7-13, 21-36, and 38-51 are available for unlicensed use in all areas. Unlicensed use in Channels 14-20 is allowed only in areas where they are not used by public safety agencies [FCC, May 2004, op. cit.].

It can be appreciated that Channels 52-69 are currently used by TV broadcasters and it is not clear if/when they will be vacated. There is significant interference in the lower channels 5-6 and 7-13. Based on these considerations, the spectrum segment 470-806 MHz covering TV channels 14-69 can be of particular interest.

Spectrum Opportunity in the TV Bands

Spectrum opportunity can be a direct result of incumbent system inefficiency. In TV bands, a signal from a TV tower can cover an area with a radius of tens of kilometers. TV receivers can be sensitive to interference such that TV cell planning may be very conservative to ensure there is essentially no co-channel interference. This can leave a substantial amount of "white spaces" between co-channel TV cells as illustrated in the the Map 300 of FIG. 3. Those "white spaces" can constitute an opportunistic region for cognitive users on a particular TV channel. Each TV channel may have a differently shaped opportunistic region. The total spectrum opportunity at any location can comprise the total number of opportunistic regions covering the location. A measurement in one locality shows an average spectrum opportunity in TV channels 14-69 of about 28 channels; that can be expressed as an equivalent bandwidth of approximately 170 MHz.

DETAILED DESCRIPTION

Figure 1:
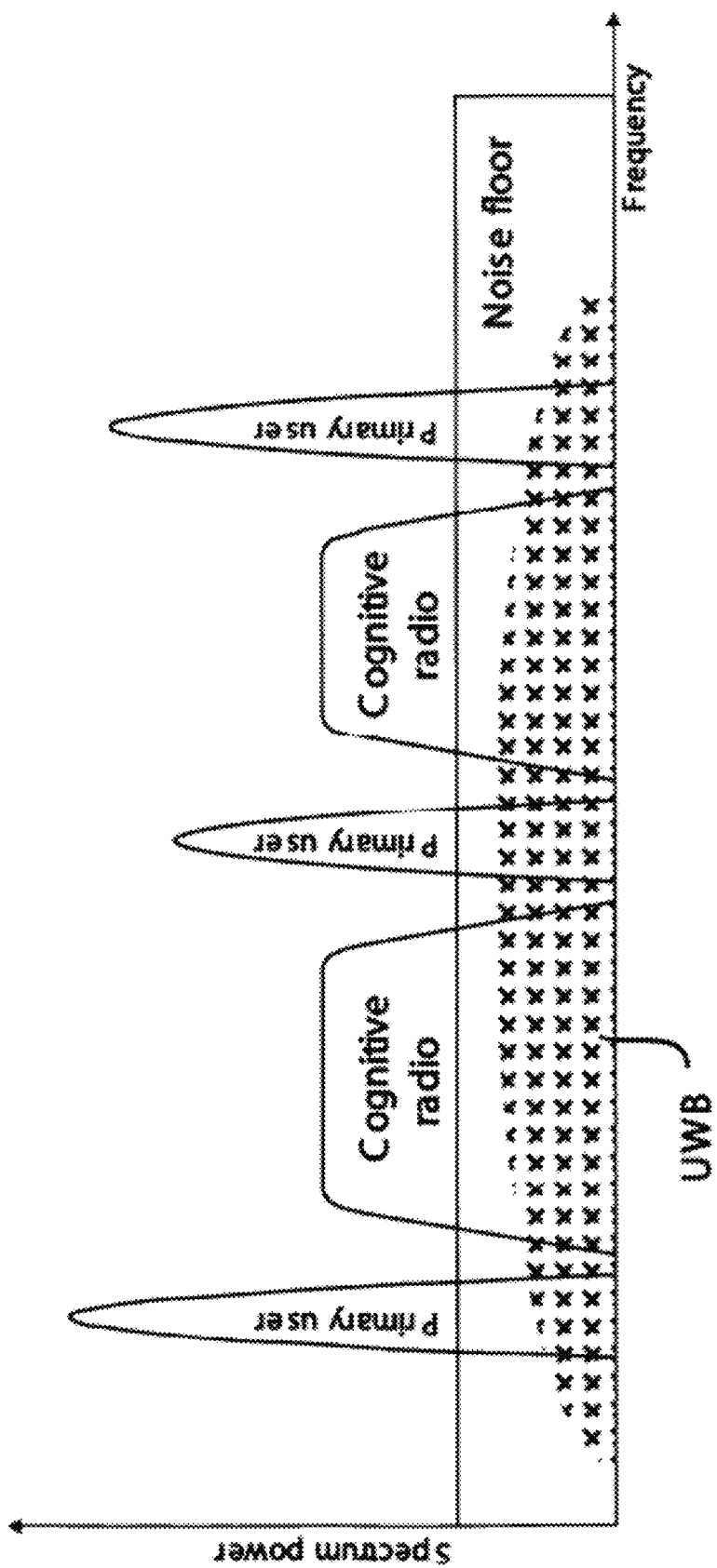
FIG. 1 graph of spectrum sharing technologies: UWB and cognitive radio
Figure 2:
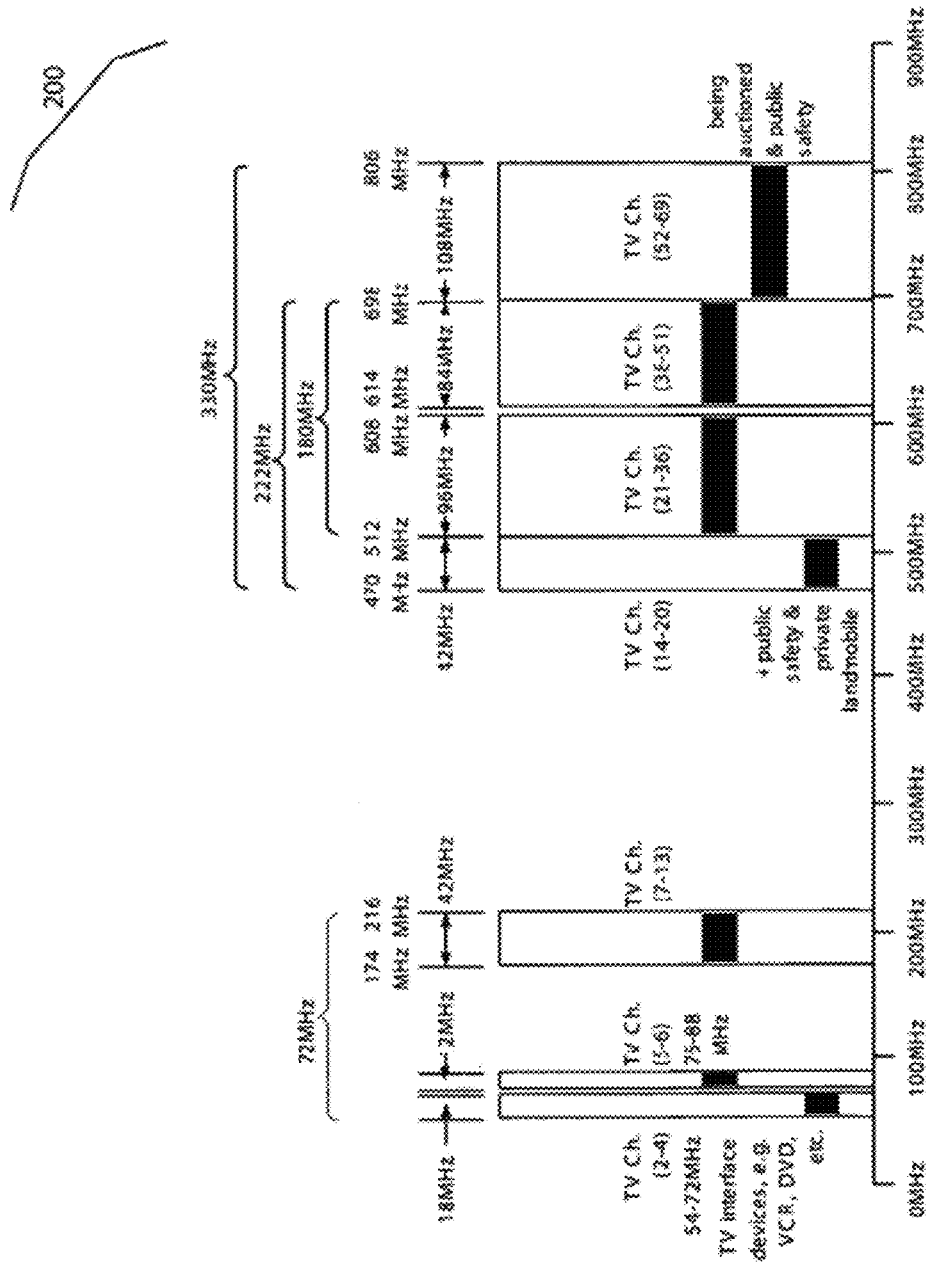
FIG. 2 graph of exemplary television channel bands
Figure 3:
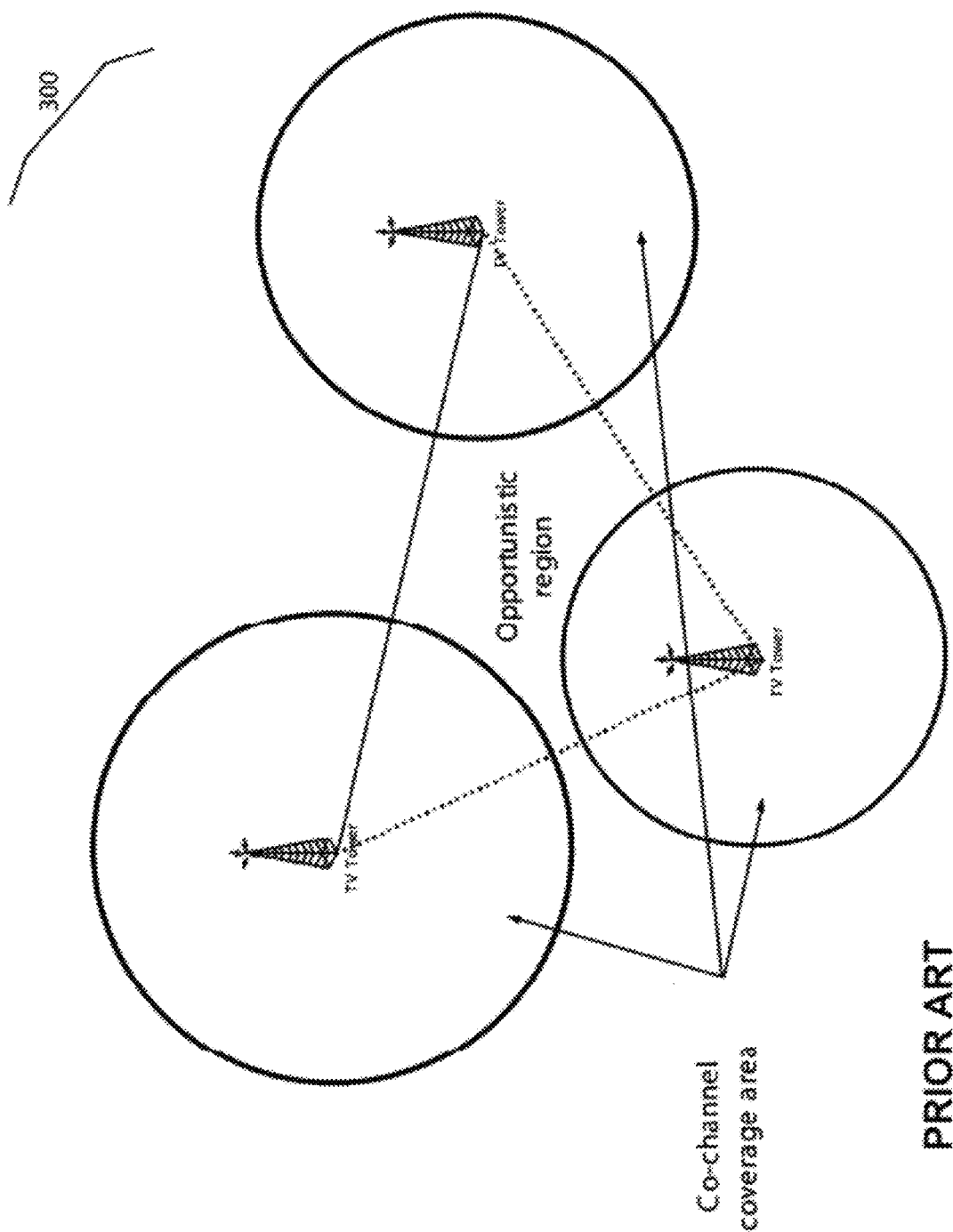
FIG. 3 map of television co-channel coverage areas and opportunistic region
Figure 4:
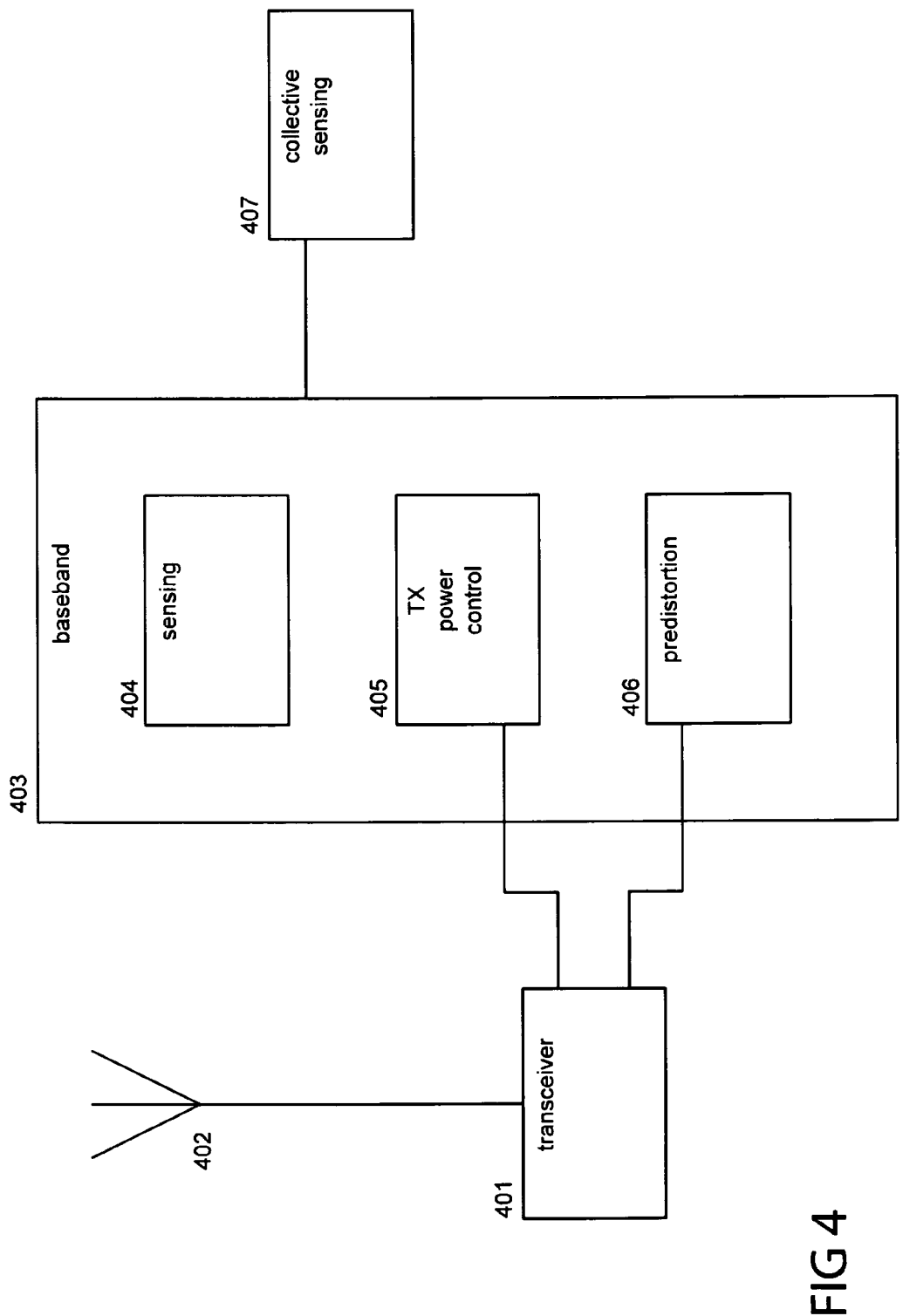
FIG. 4 diagram of a cognitive radio system

FIG. 4 depicts an embodiment of a cognitive radio system in block diagram. A transceiver 401 can be coupled to and/or in communication with one or more antennae 402. Baseband signal processing can be provided by elements of a baseband processor 403. Elements of a baseband processor 403 can comprise a sensing processor 404, a transmit power control element 405, and a pre-distortion element 406. In some embodiments a pre-distortion element 406 can be coupled to and/or in communication with a transceiver 401. In some embodiments a transmit power control element can be coupled to and/or in communication with a transceiver 401. In some embodiments a collective sensing element 407 can be coupled to and/or in communication with a baseband processor 403 and/or elements comprising a baseband processor.

In some embodiments transceiver 401 can comprise transceiver and/or transmitter and/or receiver mechanisms disclosed herein. In some embodiments sensing element 404 can comprise one or more sensing mechanisms as described herein. By way of example and not limitation these sensing mechanisms can include energy sensing, National Television System Committee (NTSC) signal sensing, and/or Advanced Television Systems Committee (ATSC) signal sensing. In some embodiments a collective sensing element 407 can provide collective sensing mechanisms as described herein.

In some embodiments transmit power control 405 can support adaptive transmit power control mechanisms described herein. In some embodiments pre-distortion element 406 can provide digital pre-distortion mechanisms as described herein.

In some embodiments baseband processor 403 can support additional processing mechanisms as described herein. By way of example and not limitation these mechanisms can include filtering and/or digital mixing.

Sensing for TV Band Adaptive Spectrum System

Sensing methods can generally be separated into two categories: 1) energy sensing and 2) phase sensing. Energy sensing can measure spectrum energy of a target signal and can be a fundamental sensing method when nothing else is known about the target signal. In some embodiments, a received signal can be transformed to a frequency domain in order to perform an energy sensing operation. Some embodiments can employ a fast Fourier transform (FFT) and/or any other known and/or convenient transformation to a frequency domain. Signal energies in specified frequency regions can subsequently be measured.

In some embodiments and/or circumstances phase sensing can achieve better performance than energy sensing. Phase sensing can require that a target signal contains one or more known signal patterns. Phase sensing can be achieved by correlating a received signal with one or more known patterns. In some embodiments of a TV-band cognitive radio system, the incumbent signal can contain known signal patterns. In some embodiments an incumbent signal can be a Digital Television (DTV) signal and/or an NTSC signal and/or any other known and/or convenient signal organized as a channel and/or having adjacent channels. In some embodiments specified performance levels can be achieved through the use of phase sensing techniques. The terms phase sensing, waveform sensing, and/or signal sensing can be considered substantially identical as discussed herein.

Figure 5:
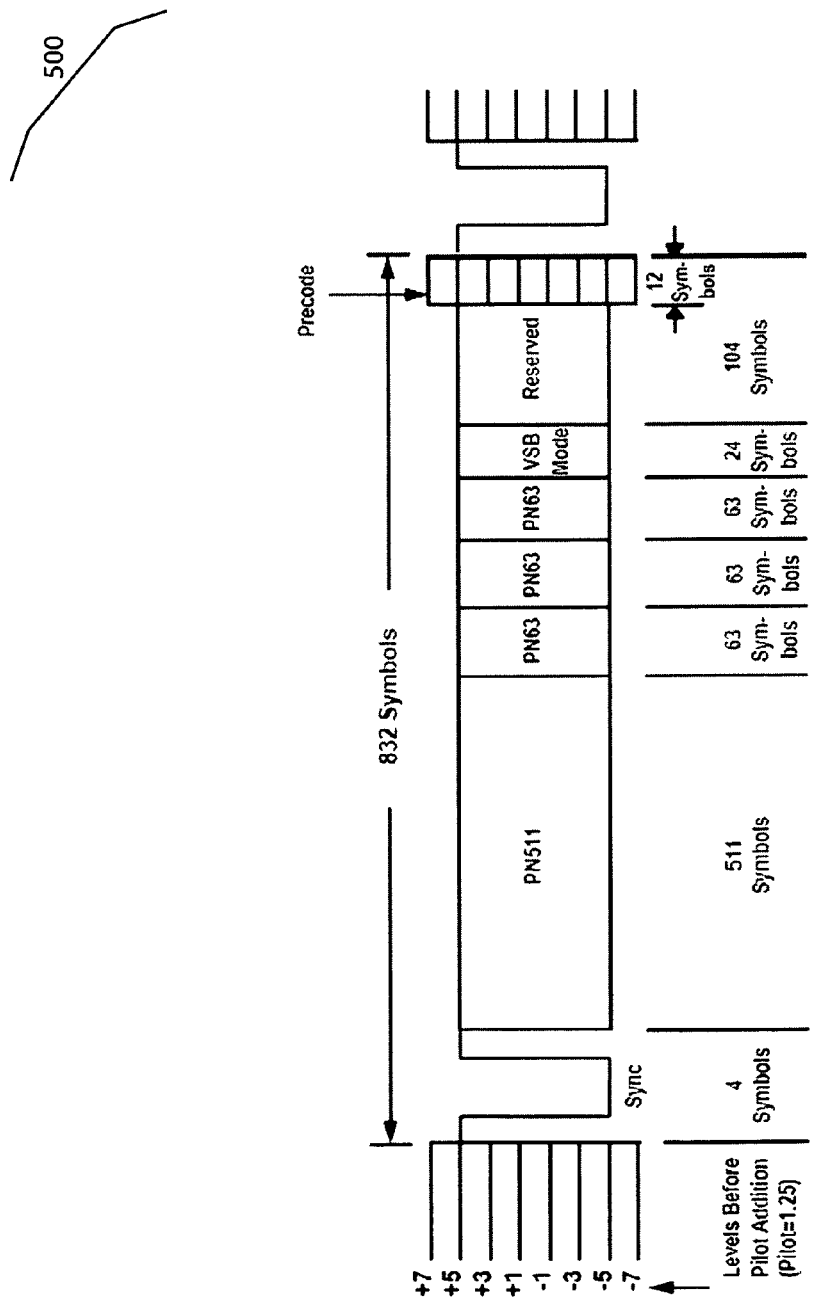
FIG. 5 DTV signal Data Field Sync segment

DTV Signal Sensing:

A broadcast DTV signal can contain a Data Field Sync [ATSC, "Digital television standard," *ATSC Digital Television Standard*, August 2001] segment of 832 symbols (at a symbol period 0.186 μs and/or a sampling frequency of 5.38 MHz) occurring every 24.2 ms. The diagram 500 of FIG. 5 shows the format of a DTV Data Field Sync segment that contains a 511-element PN sequence and three 63-element PN sequences, all of which can be specified and/or known.

A PN sequence can have useful correlation properties. A PN sequence correlated with any rotated version of itself can produce a result of −1, except when two PN sequences are aligned, in which case the result is equal to the PN sequence length. A PN sequence can be cyclically extended to create an infinite sequence s(n). It follows that $$\sum_{n=0}^{N_c-1} s^*(n)s(n-m) = (N_c+1)\delta(m) - 1 \quad (1)$$

under the assumption $m \in (-N_c, N_c)$. The above correlation can be normalized to give $$\frac{1}{N_c}\sum_{n=0}^{N_c-1} s^*(n)s(n-m) = \frac{(N_c+1)}{N_c}\delta(m) - \frac{1}{N_c} \approx \delta(m) \quad (2)$$

where the approximation can be useful for conditions where $N_c \gg 1$.

A sensing metric M(m) can be generated by correlating a received signal with a known PN sequence $$M(m) = \underbrace{\frac{1}{N_c}\sum_{n=0}^{N_c-1} s^*(n-m)y(n)}_{DTV\ sensing\ operator} \quad (3)$$

which can be expanded as $$M(m) = \frac{1}{N_c}\sum_{n=0}^{N_c-1} s^*(n-m)\left[\sum_{p=-\infty}^{\infty} c(p)s(n-p) + z(n)\right] \quad (4)$$

$$= \sum_{p=-\infty}^{\infty} c(p)\frac{1}{N_c}\sum_{n=0}^{N_c-1} s^*(n-m)s(n-p) +$$

$$\frac{1}{N_c}\sum_{n=0}^{N_c-1} s^*(n-m)z(n)$$

$$= \sum_{p=-\infty}^{\infty} c(p)\delta(p-m) + Z_M(m)$$

$$= c(m) + Z_M(m)$$

where the channel tap coefficient c(m) can be assumed to be nonzero for (only) a few taps around m=0 and where $$E[Z_M(m)Z_M^*(n)] = E\left[\frac{1}{N_c}\sum_{p=0}^{N_c-1} s^*(p-m)z(p)\frac{1}{N_c}\sum_{q=0}^{N_c-1} s(q-n)z^*(q)\right] \quad (5)$$

$$= \frac{1}{N_c^2}\sum_{p=0}^{N_c-1} s^*(p-m)\frac{1}{N_c}\sum_{q=0}^{N_c-1} s(q-n)$$

$$\sigma^2\delta(p-q)$$

$$= \frac{\sigma^2}{N_c^2}\sum_{p=0}^{N_c-1} s^*(p-m)s(p-n)$$

$$= \frac{\sigma^2}{N_c}\delta(n-m)$$

Notably, $Z_M(m)$s can be independent Gaussian random variables with power $$\frac{\sigma^2}{N_c}.$$

A symbol signal-to-noise-ratio SNR can be expressed $$SNR = \frac{\sum_{n=-\infty}^{\infty} |c(n)|^2}{\sigma^2} \quad (6)$$

A sensing metric M(m) (4) can then have a SNR $$SNR_M = \frac{|c(m)|^2}{E[|Z_M(m)|^2]} = N_c \cdot SNR \cdot \frac{|c(m)|^2}{\sum_{n=-\infty}^{\infty} |c(n)|^2} \quad (7)$$

Rake combining can be employed to eliminate the factor $$\frac{|c(m)|^2}{\sum_{n=-\infty}^{\infty} |c(n)|^2} \quad (8)$$

in equation (7). A sensing gain over a nominal symbol SNR can then be $N_c$. For example, a 63-element PN sequence can be used for sensing, wherein a sensing gain can be calculated $$10\log_{10}(63) = 18 dB \quad (9)$$

In some embodiments, a sensing gain of more than 20 dB can be achieved when a 511-element PN sequence is employed.

ATSC Signal Sensing: Signal Sensing:

The format of the Data Field Sync segment (one in each Data Field of 313 832-symbol segments) can be as shown in diagram 500 of FIG. 5. The Data Field Sync segment contains 4 binary-modulated pseudo-random sequence, i.e. one PN511 and 3 PN63. These are intended for ATSC receiver channel equalization.

When coherently combined, the PN sequences can provide significant coding gain over a nominal symbol SNR and can be employed for some embodiments with reliable low-threshold ATSC signal detection. For example, a PN63 sequence can provide about 10*log10(63)=18 dB gain over nominal SNR and a PN511 sequence can provide about 10*log10 (511)=27 dB gain over a nominal SNR.

Figure 18:
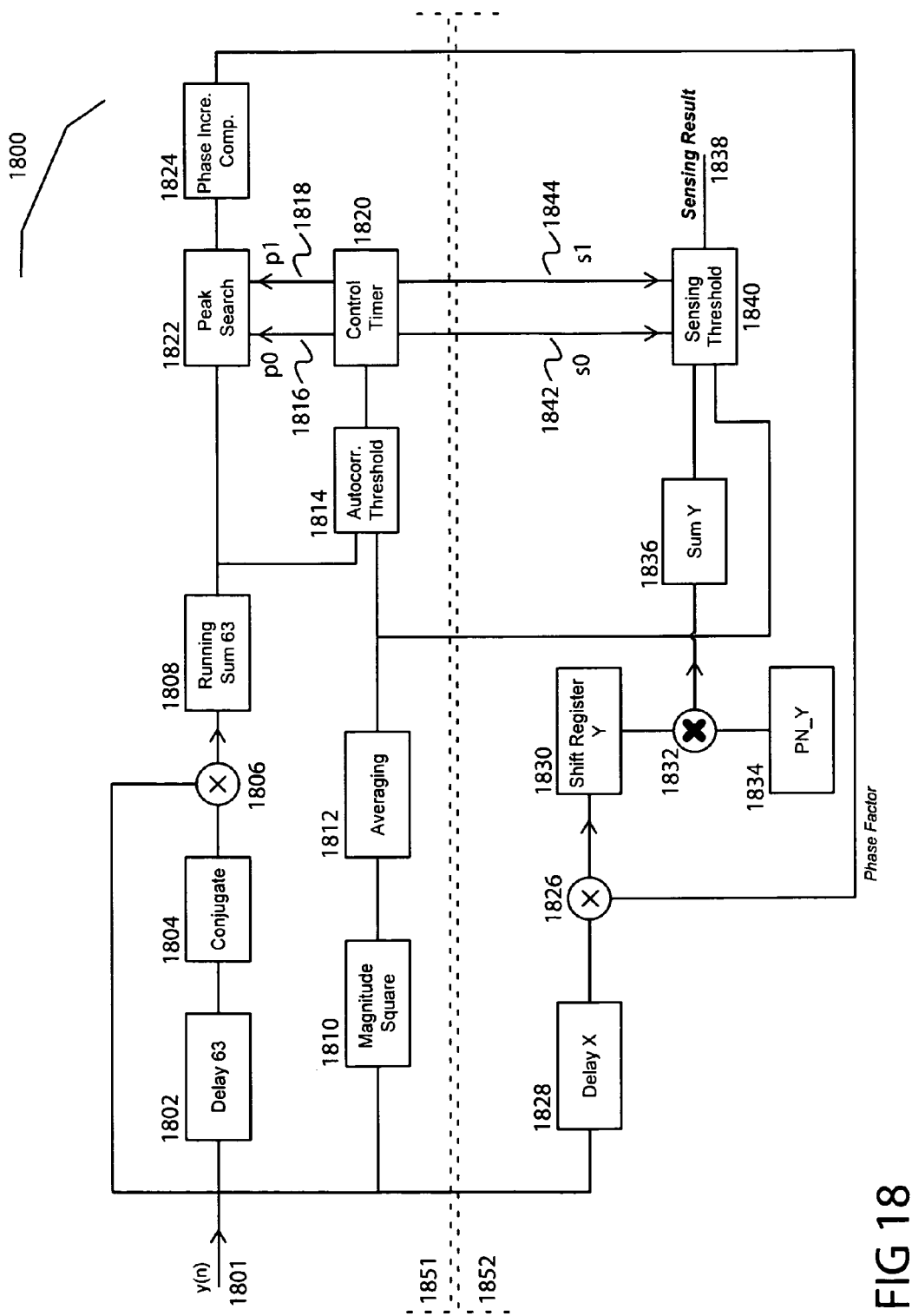
FIG. 18 diagram: ATSC signal sensing

Diagram 1800 of FIG. 18 depicts an embodiment of a detailed block diagram for an ATSC signal sensing algorithm for an input signal y(n) 1801, and providing a sensing result 1838. An algorithm is based on the use of the PN sequences PN63 and PN511 in the ATSC Data Field Sync segment. The algorithm can be described as comprising essentially two distinct parts, an upper part 1851 and a lower part 1852. The upper part 1851 can compute a signal auto-correlation using the 3 repeated PN63 sequences (refer to Data Field Sync segment format in FIG. 5). The auto-correlation can generate a frequency offset estimation that can be used to compensate the input signal so that signal cross-correlation with known PN63 and/or PN511 sequences can be performed as shown in the lower part 1852.

An auto-correlation operation can be expressed in the following formula:

$$J(n) = \sum_{l=n-62}^{n} y^*(l-63)y(l) \qquad (10)$$

Here y(l) is a received signal and y(l−63) is an input signal delayed by 63 sampling cycles; it is the output of a 63-element delay line Delay 63 1802. Conjugation, multiplication, and summing operations of Equation (10) can be performed by the respectively corresponding modules Conjugate 1804, Multiply 1806, and Running Sum 63 1808. J is the output of Running Sum 63 1808.

Figure 19:
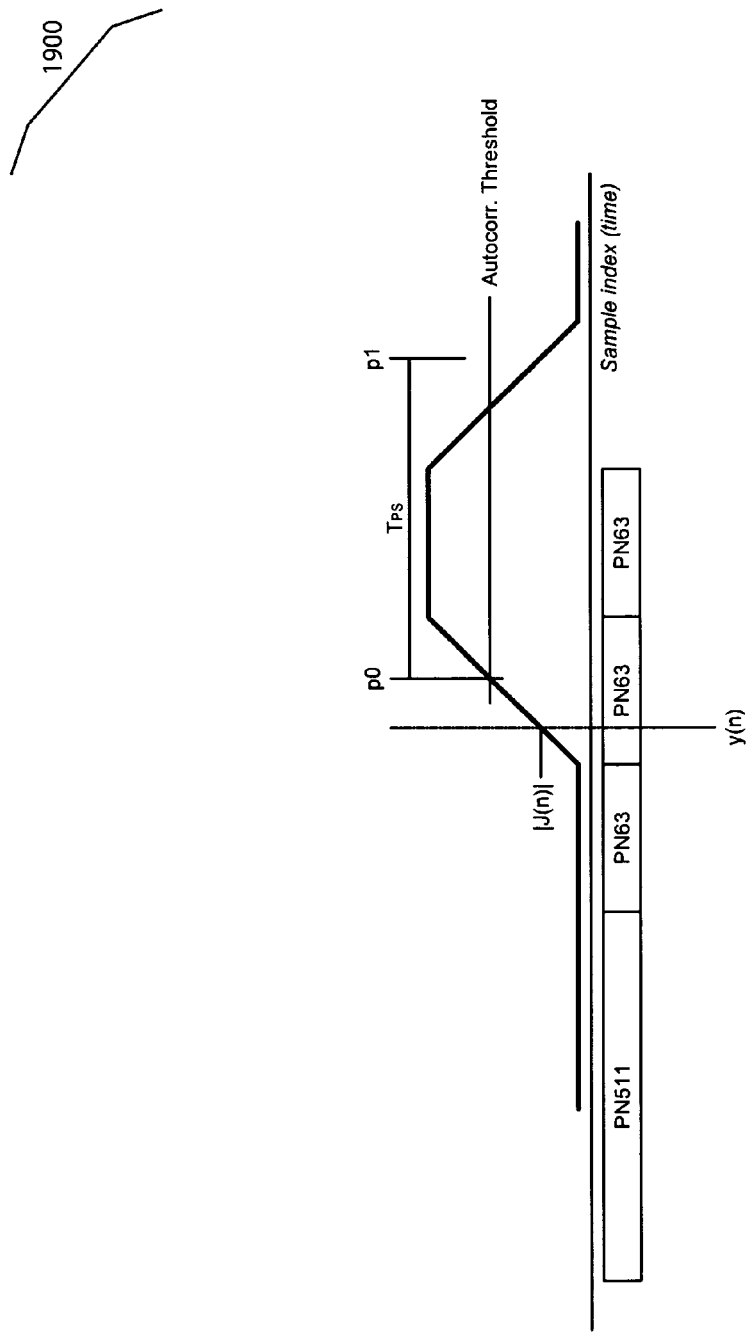
FIG. 19 diagram: auto-correlation processing.

An auto-correlation magnitude |J(n)| curve can be expected to have a plateau when the input y(n) enters the PN63 region within the Data Field Sync segment, as illustrated in FIG. 19 where |J(n)| is shown as the thicker curve. The auto-correlation magnitude |J(n)| normalized by the average signal power can be compared against a predefined threshold in order to determine whether such a situation has occurred.

An average signal power can be computed by elements of diagram 1800, including a Magnitude Square 1810 module and an Averaging 1812 module. An average signal power can be expressed as:

$$P(n) = \frac{1}{N} \sum_{l=n-(N-1)}^{n} |y(l)|^2 \qquad (11)$$

A direct implementation of averaging in Equation (11) can be achieved employing numerous techniques well known in the art. In a reduced hardware implementation embodiment, an Infinite Impulse Response (IIR) with a forgetting factor 1/N can be employed. The IIR filter output can serve as a close approximation to an actual running sum output. Operation of an averaging IIR filter embodiment can be expressed as:

$$P(n) = \frac{1}{N}|y(n)|^2 + \left(1 - \frac{1}{N}\right)P(n-1) \qquad (12)$$

where P(n−1) is the IIR filter output for the sampling cycle immediately previous. It can be appreciated that averaging depth N is a parameter common to a plurality of implementations. In some embodiments, a relatively large N can be employed in order to achieve specified performance criteria for computation of average power. For example, N can be chosen to be 500.

An Autocorr. Threshold 1814 module can compare normalized auto-correlation magnitude, i.e.:

$$\frac{|J(n)|}{P(n)} \qquad (13)$$

against a specified pre-defined threshold, e.g. 0.45. A threshold can be specified such that values exceeding the threshold indicate a specified reasonable confidence of entering a PN63 region of a Data Field Sync segment, whereupon a peak search operation can follow.

A Peak Search 1822 operation can be controlled by two time stamps: peak search start p0 1816 and peak search end p1 1818. These time stamps can be generated by a Control Timer 1820 module. In the event that an autocorrelation threshold is exceeded at sampling index n, a requirement can follow that:

$$p0 \geq n \qquad (14)$$

A p0 1816 value can typically be chosen to be equal to n. The duration between time stamps:

$$T_{PS} = p1 - p0 \qquad (15)$$

can be specified to be long enough so that it can cover a plateau region of normalized auto-correlation magnitude as shown in diagram 1900. For example, $T_{PS}$ can be chosen to be twice the PN63 length, i.e. 126.

Between the two time stamps p0 and p1, a Peak Search 1822 module can be activated in order to search for an auto-correlation J(n) that corresponds to a maximum normalized auto-correlation magnitude, as expressed in Equation (13). This maximum auto-correlation can be used to estimate a frequency offset and/or to generate a phase increment in order to derotate an input signal in order to compensate for a frequency offset. Taking into account frequency offset, the auto-correlation can be expressed as:

$$y(n) \, J(n) = e^{j2\pi\rho \cdot 63} \sum_{l=n-63}^{n} y^*(l-63)y(l) \qquad (16)$$

with per sample frequency offset $\rho = \Delta f_c T_s$ where $\Delta f_c$ is the frequency offset and $T_s$ is the sampling period. Referring to diagram 1900, for a maximum J(n) (within the plateau region) it can be expected that $$y(l-63) = y(l) \qquad (17)$$

if noise is neglected. Thus Equation (16) becomes:

$$e^{j2\pi\rho \cdot 63} = \frac{J(n)}{\sum_{l=n-63}^{n} |y(l)|^2} \qquad (18)$$

and a frequency offset per sample can be estimated:

$$2\pi\rho = \frac{\arg[J(n)]}{63} \qquad (19)$$

The above computation can be performed by the Phase Incre. Comp. 1824 module. The module can generate an incrementing phase factor:

$$e^{-j2\pi\rho n} \qquad (20)$$

that can be used to compensate input signal samples y(n) 1801 for frequency offset when (complex) multiplied by this factor.

The complex multiplier 1826 can perform this multiplication on a delayed version of the input signal.

ATSC signal sensing can be performed by correlating compensated input signal samples with known PN sequence patterns. PN511 and/or PN63 can be used for such correlation. In order for correlation to be performed after frequency offset is computed, a start time of such correlation c0 can be required to satisfy:

$$c0 \geq p1 \quad (21)$$

In some embodiments a delay element Delay X 1828 can be provided between input signal samples and complex multiplier 1826 employed for frequency offset compensation. This delay element can ensure that frequency offset compensation will not be missed on the target PN sequence pattern.

In one example, the desired PN sequence pattern can be PN511, referring to diagram 1900. Assuming that the start of PN511 is n0, a length X of the delay element Delay X 1828 can be required to satisfy:

$$X \geq c0 - n0 \geq p1 - n0 = T_{PS} + (p0 - n0) \quad (22)$$

Assuming that p0 occurs before the end of a third PN63, then a maximum distance between p0 and n0 can be 511+63×3=700. The length of the delay element can be required to be at least:

$$X = T_{PS} + 700 \quad (23)$$

If the desired PN sequence is the third PN63, a maximum distance between p0 and n0 is 63, and thus a required length of delay element can be:

$$X = T_{PS} + 63 \quad (24)$$

Note that as discussed previously, PN511 can give higher coding gain than PN63 (27 dB versus 18 dB). However, if a desired coding gain is less than 18 dB, the third PN63 can be selected as the target correlation pattern in order to minimize computational complexity.

Compensated signal samples can be piped through a shift register Shift Register Y 1830 whose size can be equal to the length of a target PN sequence, e.g. 511 for PN511 and 63 for PN63. A signal pattern in the shift register can then be correlated with a target PN sequence to generate a sensing metric for thresholding, i.e.

$$M(n) = \sum_{l=0}^{Y-1} s(n-l) \cdot b(Y-1-l) \quad (25)$$

Here s(n−l) is the l-th element of the shift register and b(l) is the l-th element of the PN sequence. Y can be take on the value of 511 or 63, depending on the PN sequence used. Equation (25) can be implemented by modules Shift Register Y 1830, vector multiplier 1832, PN_Y 1834, and Sum Y 1836. PN_Y 1834 can provide a PN sequence to the vector multiplier 1832. Sum Y 1836 can perform a summing operation on input provided by the vector multiplier 1832 and provide a result to a Sensing Threshold 1840 module.

Power of an averaged sensing metric normalized by an average signal power, i.e.:

$$\frac{\left|\frac{1}{Y}M(n)\right|^2}{P(n)} \quad (26)$$

can then be compared with a threshold to determined ATSC signal presence. For example, such a threshold could have a value of 0.25. Threshold comparisons can be performed by the Sensing Threshold 1840 module.

Sensing Threshold 1840 module can be activated between times represented by time stamps s0 1842 and s1 1844; these time stamps can be generated by a Control Timer 1820 module. For example, s0 can be chosen to be p1, and, s1 can be chosen to ensure that a desired PN sequence completely passes through the shift register.

Figure 6:
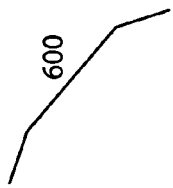
FIG. 6 NTSC signal video (V), chroma (C), and audio (A) carriers
Figure 6:
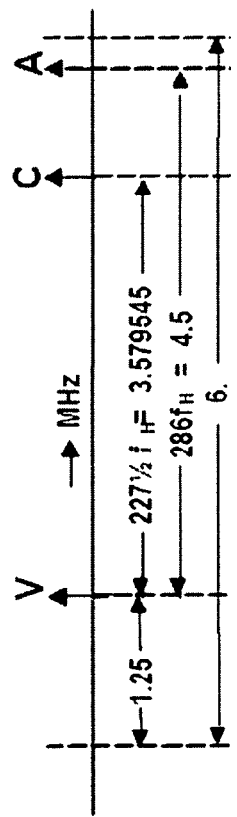

NTSC Signal Sensing:

A NTSC (analog TV) signal can contain narrowband video, chroma, and audio carriers. Video, chroma, and audio carriers can be located at 1.25 MHz, 4.83 MHz, 5.75 MHz from the left band edge respectively, as depicted in the diagram 600 of FIG. 6.

Since a video carrier can have significantly higher power than other carriers in the composite signal, some embodiments of NTSC signal sensing can be based on video carrier sensing; hence chroma and audio carriers are neglected in the following analysis. A transmitted TV signal can be approximated in the following form:

$$s(n) = \underbrace{e^{j2\pi \frac{k_v}{N}n}}_{\text{Video carrier}} + \underbrace{\mu x(n)}_{\text{Data}} \quad (27)$$

where μ is the modulation index [A. B. Carlson, *Communication Systems*.

Electrical and Electronic Engineering Series, McGraw-Hill, third ed., 1986]. Data signal samples x can be assumed to be independent with unit power, i.e.

$$E[x(n)x^*(m)] = \delta(n-m) \quad (28)$$

A sensing operator can be applied to a received signal in order to generate a sensing metric:

$$M(m) = \underbrace{\frac{1}{N} \sum_{n=-N/2}^{N/2-1} e^{-j2\pi \frac{k_v}{N}(n-m)} y(n)}_{\text{NTSC sensing operator}} \quad (29)$$

$$= e^{j2\pi \frac{k_v}{N}m} \frac{1}{N} \sum_{n=-N/2}^{N/2-1} e^{-j2\pi \frac{k_v}{N}n} \left[ \sum_{p=-\infty}^{\infty} c(p) s(n-p) + z(n) \right]$$

It can be appreciated that such a sensing operator can be essentially equivalent to an FFT-based narrowband filter. A multipath delay spread can be assumed to be time-limited; it follows that c(p) can be nonzero only when $$|p| < L \quad (30)$$

Terms can be considered $$\frac{1}{N} \sum_{n=-N/2}^{N/2-1} e^{-j2\pi \frac{k_v}{N}n} \sum_{p=-\infty}^{\infty} c(p) s(n-p) = \quad (31)$$

$$\sum_{|p|<L} c(p) e^{-j2\pi \frac{k_v}{N}p} \frac{1}{N} \sum_{n=-N/2}^{N/2-1} e^{-j2\pi \frac{k_v}{N}(n-p)} s(n-p) =$$

-continued $$\sum_{|p|<L} c(p)e^{-j2\pi\frac{k_v}{N}p} \frac{1}{N} \sum_{q=-N/2-p}^{N/2-1-p} e^{-j2\pi\frac{k_v}{N}q}s(q) =$$

$$\sum_{|p|<L} c(p)e^{-j2\pi\frac{k_v}{N}p} \left\{ \frac{1}{N} \sum_{q=-N/2-p}^{-N/2-1} + \frac{1}{N} \sum_{q=-N/2}^{N/2-1} - \frac{1}{N} \sum_{q=-N/2-p}^{N/2-1} \right\} e^{-j2\pi\frac{k_v}{N}q}s(q) \approx$$

$$\sum_{|p|<L} c(p)e^{-j2\pi\frac{k_v}{N}p} \frac{1}{N} \sum_{q=-N/2}^{N/2-1} e^{-j2\pi\frac{k_v}{N}q}s(q) = NC(k_v)S(k_v)$$

where an approximation can be taken assuming $$N \gg L > |p| \tag{32}$$

and for a channel frequency response $C(k_v)$ and a spectral signal value $S(k_v)$ at a video carrier frequency $$f = \frac{k_v}{NT_s}$$

where:

$$C(k_v) = \frac{1}{N} \sum_{n=-N/2}^{N/2-1} c(n)e^{-j2\pi\frac{k_v}{N}n} \tag{33}$$

$$S(k_v) = \frac{1}{N} \sum_{n=-N/2}^{N/2-1} s(n)e^{-j2\pi\frac{k_v}{N}n} \tag{34}$$

Similarly, spectral noise $Z(k_v)$ at a frequency $k_v$ can be expressed as $$Z(k_v) = \frac{1}{N} \sum_{n=-N/2}^{N/2-1} z(n)e^{-j2\pi\frac{k_v}{N}n} \tag{35}$$

Given the definitions above, a sensing metric $M(m)$ can be expressed as $$M(m) = e^{j2\pi\frac{k_v}{N}m}[NC(k_v)S(k_v) + Z(k_v)] \tag{36}$$

$S(k_v)$ can be further expanded using equation (27):

$$S(k_v) = \frac{1}{N} \sum_{n=-N/2}^{N/2-1} \left[ e^{j2\pi\frac{k_v}{N}n} + \mu x(n) \right] e^{-j2\pi\frac{k_v}{N}n} \tag{37}$$

$$= 1 + \mu X(k_v)$$

where $$X(k_v) = \frac{1}{N} \sum_{n=-N/2}^{N/2-1} x(n)e^{-j2\pi\frac{k_v}{N}n} \tag{38}$$

A sensing metric $M(m)$ can then be expressed as $$M(m) = e^{j2\pi\frac{k_v}{N}m}\left[ \underbrace{NC(k_v) + \mu NC(k_v)X(k_v)}_{\text{Signal}} + \underbrace{Z(k_v)}_{\text{Noise}} \right] \tag{39}$$

Note that in some embodiments a NTSC data signal can be considered as noise when sensing is performed, since it is not being decoded. Since a data signal and noise are independent, a total sensing metric noise power can be expressed as:

$$\mu^2 N^2 |C(k_v)|^2 E[|X(k_v)|^2] + E[|Z(k_v)|^2] \tag{40}$$

where $$E[|X(k_v)|^2] = E\left[ \left| \frac{1}{N} \sum_{n=-N/2}^{N/2-1} x(n)e^{-j2\pi\frac{k_v}{N}n} \right|^2 \right] \tag{41}$$

$$= \frac{1}{N^2} \sum_{n,m=-N/2}^{N/2-1} e^{-j2\pi\frac{k_v}{N}(n-m)} E[x(n)x^*(m)]$$

$$= \frac{1}{N}$$

and similarly $$E[|Z(k_v)|^2] = \frac{\sigma^2}{N} \tag{42}$$

An NTSC data signal power can be expressed $$E[|c(n) \otimes \mu x(n)|^2] = \mu^2 \sum_{n=-\infty}^{\infty} |c(n)|^2 = \mu^2 \sum_{|n|<L} |c(n)|^2 = \mu^2 \sum_{n=-N/2}^{N/2-1} |c(n)|^2 \tag{43}$$

Using an inverse fast Fourier transform (IFFT), the NTSC data signal power can further be expressed as $$\mu^2 \sum_{n=-N/2}^{N/2-1} |c(n)|^2 = \mu^2 \sum_{n=-N/2}^{N/2-1} \left[ \sum_{k=-N/2}^{N/2-1} C(k)e^{j2\pi\frac{k}{N}n} \right] \tag{44}$$

$$\left[ \sum_{l=-N/2}^{N/2-1} C^*(l)e^{-j2\pi\frac{l}{N}n} \right]$$

$$= \mu^2 \sum_{k=-N/2}^{N/2-1} \sum_{l=-N/2}^{N/2-1} C(k)C^*(l) \sum_{n=-N/2}^{N/2-1} e^{j2\pi\frac{k-l}{N}n}$$

$$= \mu^2 \sum_{k=-N/2}^{N/2-1} \sum_{l=-N/2}^{N/2-1} C(k)C^*(l)N\delta(k-l)$$

$$= \mu^2 N \sum_{k=-N/2}^{N/2} |C(k)|^2$$

A data signal SNR can then be expressed as $$SNR = \frac{E[|c(n) \otimes \mu x(n)|^2]}{E[|z(n)|^2]} = \frac{\mu^2 N \sum_{k=-N/2}^{N/2} |C(k)|^2}{\sigma^2} \tag{45}$$

A SNR of the a metric expressed in Equation (39) can then be expressed $$SNR_M = \frac{N^2|C(k_v)|^2}{\mu^2 N^2 |C(k_v)|^2 E[|X(k_v)|^2] + E[|Z(k_v)|^2]} \quad (46)$$

$$= \frac{N^2|C(k_v)|^2}{\mu^2 N |C(k_v)|^2 + \frac{\sigma^2}{N}}$$

$$= \frac{N^2|C(k_v)|^2}{\mu^2 N |C(k_v)|^2 + \frac{\mu^2 \sum_{k=-N/2}^{N/2} |C(k)|^2}{SNR}}$$

$$= \frac{1}{\mu^2} \frac{N \cdot SNR}{SNR + \eta}$$

where $$\eta = \frac{\sum_{k=-N/2}^{N/2} |C(k)|^2}{N|C(k_v)|^2} \quad (47)$$

It follows that a sensing gain can be expressed $$10\log_{10}\frac{SNR_M}{SNR} = 10\log_{10}\left(\frac{1}{\mu^2} \frac{N}{SNR + \eta}\right) \quad (48)$$

Figure 7:
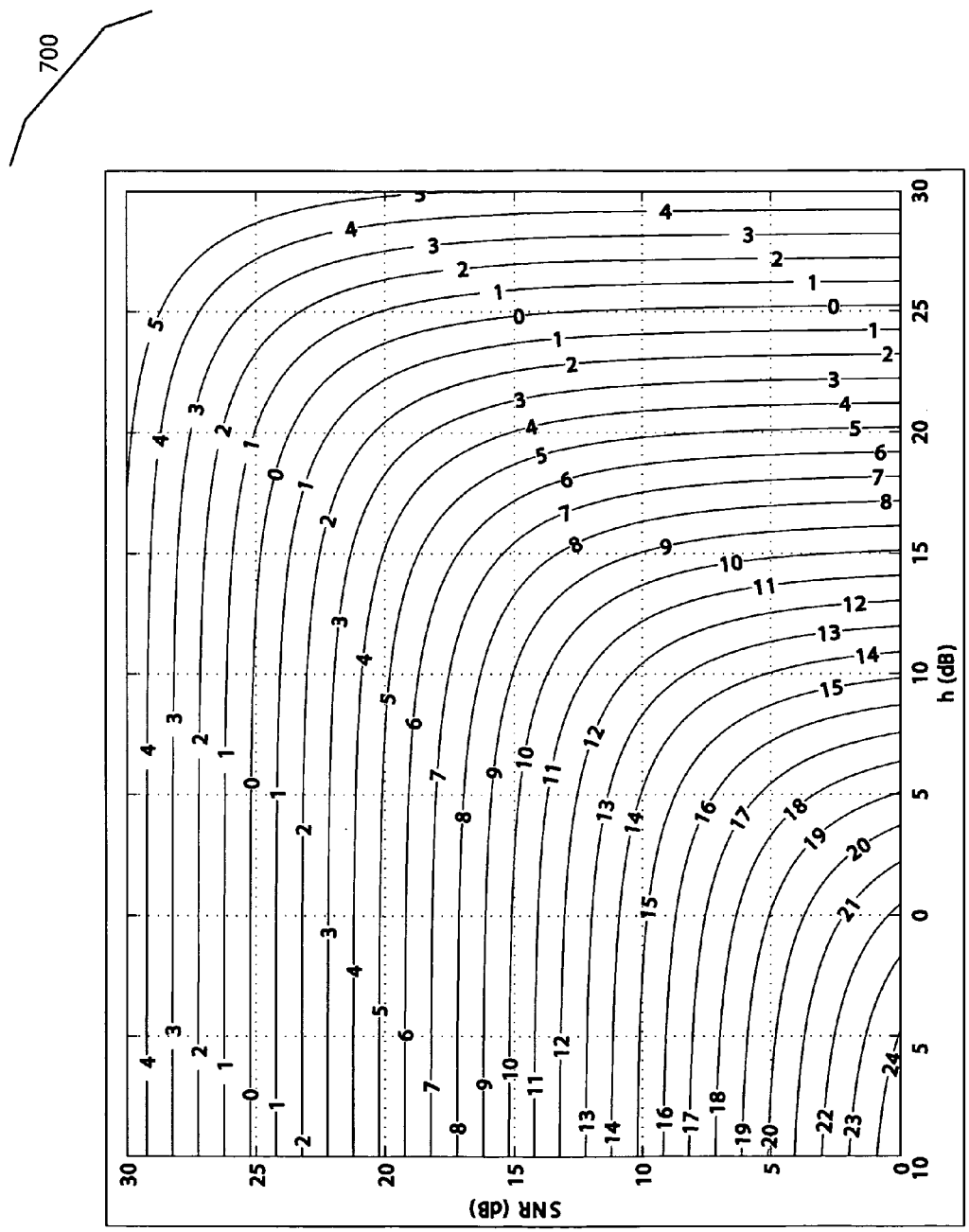
FIG. 7 graph: Simulated NTSC signal sensing gain contours

In some embodiments, a sensing gain can decrease with an increasing SNR. In some embodiments this property can be neglected since at high SNR, sensing can be relatively successful essentially regardless of a sensing gain value. A factor $\eta$ can be a measure of multipath fading on a video carrier. When the fading is significant, the sensing gain can become smaller. The graph 700 of FIG. 7 shows sensing gain contours at different SNRs and fading levels $\eta$ where N=256 and $\mu$=0.875 (TV video signal modulation index according to [A. B. Carlson, op. cit.]). It can be appreciated that sensing gain can increase with increasing N. In some fading environments, a narrowband fade could be larger than 30 dB [T. S. Rappaport, *Wireless Communications Principles and Practice*. Prentice-Hall, 1996]. Rather than simply increasing the correlation depth N in order to ameliorate this effect, it can be advantageous in some embodiments to share sensing information with other users. In some embodiments, multipath fading can be a local phenomenon whose effects can be statistically reduced by combining sensing results from different locations.

Energy Sensing:

Energy sensing can be employed as a fundamental method of signal detection in some embodiments; any information-conveying signal has finite energy. In some embodiments, energy-based sensing can suffer from a drawback of a longer convergence time as compared to phase-based sensing, as discussed herein regards DTV and NTSC signal sensing. Energy-based sensing can achieve salutary specified performance levels under the conditions of a high SNR, in some embodiments. Furthermore, in some embodiments energy-based sensing can be used to estimate a SNR. A received signal y(n) can be expressed as $$y(n)=x(n)+z(n) \quad (49)$$

A sequence of signal samples x(n) can be assumed to be independent, in order to simplify derivation. Correlation between signal samples x(n)s, e.g. due to multipath channel memory effect, can (only) improve sensing performance. Since the noise sample z(n)s are independent, the received signal sample y(n)s are independent.

Consider a signal energy S obtained by averaging:

$$S = \frac{1}{N_B}\sum_{n=1}^{N_B} |y(n)|^2 \quad (50)$$

where $N_B$ can be an averaging buffer size. Since $|y(n)|^2$ can be a sequence of independent and identically distributed (IID) random variables with mean and variance, it follows that:

$$E[|y(n)|^2]=\mu \quad (51)$$

$$E[|y(n)|^4]=\sigma^2 \quad (52)$$

Assuming $N_B \gg 1$, according to the central limit theorem, S can be approximated as a Gaussian random variable with mean $\mu_S$ and variance $\sigma_S^2$:

$$\mu_S = \mu \quad (53)$$

$$\sigma_S^2 = \frac{\sigma^2}{N_B} \quad (54)$$

PFD vs. PLD:

When there is no signal present, i.e. x(n)=0, the result of averaging can be expressed:

$$S_0 = \frac{1}{N_B}\sum_{n=1}^{N_B} |z(n)|^2 \quad (55)$$

When there is a signal present, the result of the averaging can be expressed $$S_1 = \frac{1}{N_B}\sum_{n=1}^{N_B} |y(n)|^2 \quad (56)$$

where y(n) is given by Equation (49). A threshold $S_T$ can be used to determine whether a signal is present. A value of (averaged) signal energy exceeding the threshold can correspond to the presence of a signal. A value of (averaged) signal energy not exceeding the threshold can correspond to the absence of a signal.

Figure 8:
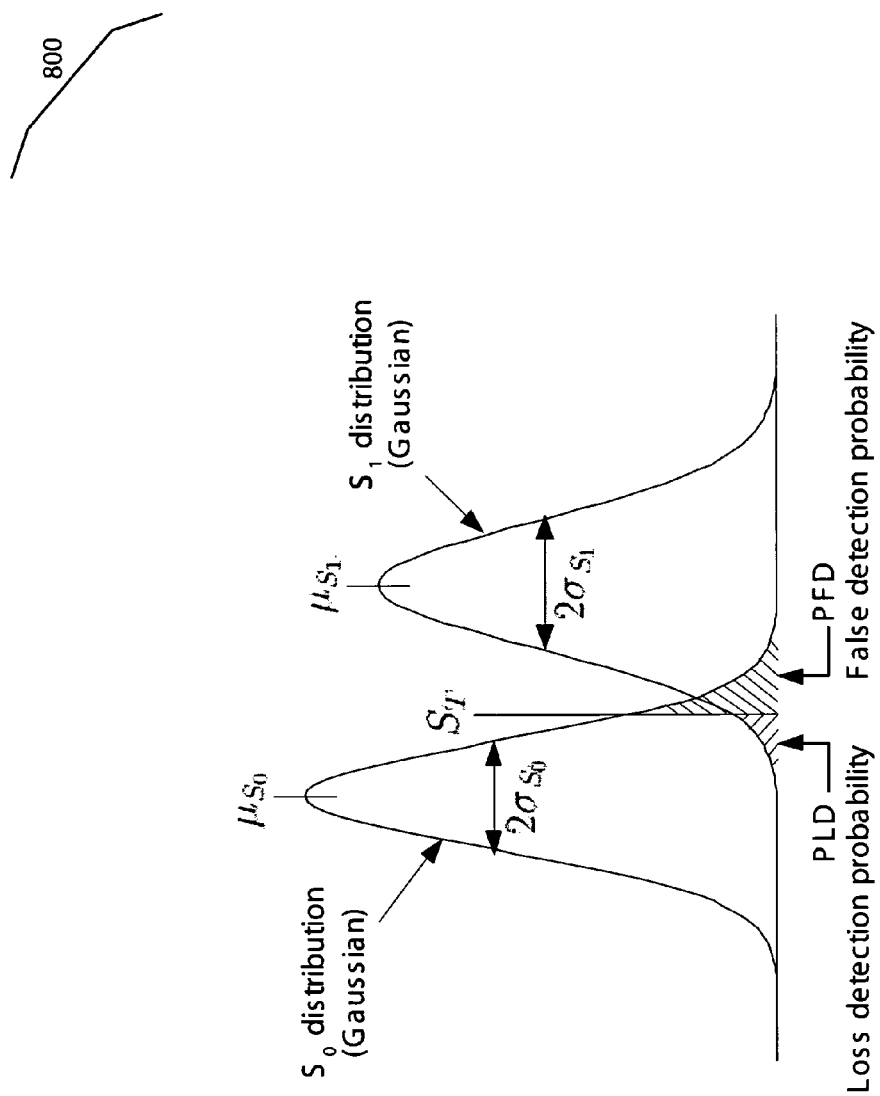
FIG. 8 diagram: false detection probability and loss detection probability.

As illustrated in the graph 800 of FIG. 8, a probability of false detection (PFD) is the probability that the sensing indicates signal presence (i.e. energy average of Equation (50) above threshold) when there is noise but essentially no signal present. A probability of loss detection (PLD) is the probability that sensing indicates absence of a signal (i.e. energy average Equation (50) below threshold) when there is a signal present. A threshold can be set relatively high, thus reducing PFD at the expense of increased PLD. The threshold can be set relatively low, thus reducing PLD at the expense of increased PFD. Thus an optimal threshold $S_T$ can be selected at an operating point where PFD is essentially equal to PLD.

Sensing Error Floor Calculation:

A sensing error floor (SEF) can be defined as the PFD, or equivalently PLD, at an optimal threshold. A general expression for a sensing error floor can be derived. Referring to FIG. 8, a PFD can be expressed using a Q function:

$$PFD = Q\left(\frac{S_T - \mu_{S_0}}{\sigma_{S_0}}\right) \quad (57)$$

and a PLD can be expressed using a Q function:

$$PLD = 1 - Q\left(\frac{S_T - \mu_{S_1}}{\sigma_{S_1}}\right) = Q\left(-\frac{S_T - \mu_{S_1}}{\sigma_{S_1}}\right) \quad (58)$$

using a symmetry property of the Q function. (A Q-function can be defined as the complement of a standard normal cumulative distribution function.) At the sensing error floor, the PFD is equal to the PLD, i.e.

$$Q\left(\frac{S_T - \mu_{S_0}}{\sigma_{S_0}}\right) = Q\left(-\frac{S_T - \mu_{S_1}}{\sigma_{S_1}}\right) \Rightarrow \frac{S_T - \mu_{S_0}}{\sigma_{S_0}} = -\frac{S_T - \mu_{S_1}}{\sigma_{S_1}} \quad (59)$$

which leads to a solution of the threshold $$S_T = \frac{\mu_{S_0}\sigma_{S_1} + \mu_{S_1}\sigma_{S_0}}{\sigma_{S_0} + \sigma_{S_1}} \quad (60)$$

Substituting from Equation (60) for $S_T$ in Equation (57), the sensing error floor can be expressed $$SEF = Q\left(\frac{\mu_{S_1} - \mu_{S_0}}{\sigma_{S_0} + \sigma_{S_1}}\right) \quad (61)$$

Using Equations (53) and (54), the sensing error floor can be further expressed as $$SEF = Q\left(\frac{\mu_1 - \mu_0}{\frac{\sigma_0}{\sqrt{N_B}} + \frac{\sigma_1}{\sqrt{N_B}}}\right) = Q\left(\sqrt{N_B}\frac{\mu_1 - \mu_0}{\sigma_0 + \sigma_1}\right) \quad (62)$$

where $$\mu_0 = E[|z(n)|^2] \quad (63)$$

$$\sigma_0 = \sqrt{E[(|z(n)|^2 - \mu_0)^2]} \quad (64)$$

$$\mu_1 = E[|y(n)|^2] \quad (65)$$

$$\sigma_1 = \sqrt{E[(|y(n)|^2 - \mu_1)^2]} \quad (66)$$

(For simplicity, in the following derivations, the sample index n is omitted.) The noise power can be assumed to be $$\mu_0 = E[|z|^2] = P_N \quad (67)$$

The noise covariance can be expressed $$\sigma_0^2 = E[(|z|^2 - \mu_0)^2] \quad (68)$$
$$= E[|z|^4 - 2\mu_0|z|^2 + \mu_0^2]$$
$$= E[|z|^4] - \mu_0^2$$
$$= (\alpha_{complex\text{-}gaussian} - 1)P_N^2$$
$$= (2-1)P_N^2$$
$$= P_N^2$$

where $$\alpha_{complex\text{-}gaussin} = \frac{E[|z|^4]}{\{E[|z|^2]\}^2} \quad (69)$$

The signal power can be assumed to be $$P_S = E[|x|^2] \quad (70)$$

so that $$\mu_1 = E[|y|^2] = E[|x|^2] + E[|z|^2] = P_S + P_N \quad (71)$$

Finally, the covariance $$\sigma_1^2 = E[(|y|^2 - \mu_1)^2] \quad (72)$$
$$= E[|y|^4] - \mu_1^2$$

$E[|y|^4]$ can be expanded as $$E[|y|^4] = E[\{(x+z)(x^* + z^*)\}^2] \quad (73)$$
$$= E[(|x|^2 + |z|^2 + xz^* + zx^*)^2]$$
$$= E[|x|^4 + |z|^4 + x^2(z^*)^2 + (x^*)^2z^2 + 2|x|^2|z|^2 +$$
$$2|x|^2xz^* + 2|x|^2x^*z + 2x|z|^2z^* + 2x^*|z|^2z + 2|x|^2|z|^2]$$

Assuming $E[x]=E[z]=0$ all terms involving the first-order of x and z in equation (73) can vanish after an expectation operation. Since z is a complex Gaussian random variable, i.e. $z=u+jv$, it follows that $$E[z^2]=E[u^2-v^2]+2jE[u]E[v]=0=E[(z^*)^2] \quad (74)$$

and thus all terms involving the second-order of z in equation (73) can vanish after expectation. Equation (73) can then be simplified to:

$$E[|y|^4]=E[|x|^4]+E[|z|^4]+4E[|x|^2]4E[|z|^2] \quad (75)$$

For a complex Gaussian random variable z, $$E[|z|^4]2\{E[|z|^2]\}^2=2P_N^2 \quad (76)$$

For $$E[|x|^4]=\alpha\{E[|x|^2]\}^2=\alpha P_S^2 \quad (77)$$

Equation (75) can be expressed as $$E[|y|^4]=\alpha P_S^2 + 2P_N^2 + 4P_N P_S \quad (78)$$

Substituting the above in equation (72) and using equation (71), it follows that $$\sigma_1^2 = E[|y|^4] - \mu_1^2 \quad (79)$$

-continued $$= \alpha P_S^2 + 2P_N^2 + 4P_N P_S - (P_N + P_S)^2$$
$$= (\alpha - 1)P_S^2 + 2P_N P_S + P_N^2$$

Using equations (67) (68) (71), and (79), the sensing error floor SEF of equation (62) can be alternatively expressed as $$SEF = Q\left[\sqrt{N_B} \frac{P_S}{P_N + \sqrt{(\alpha-1)P_S^2 + 2P_N P_S + P_N^2}}\right] \quad (80)$$
$$= Q\left[\sqrt{N_B} \frac{SNR}{1 + \sqrt{(\alpha-1)SNR^2 + 2 \cdot SNR + 1}}\right]$$

α s for some typical types of signals are shown in the following table:

| Type | Example | α |
|---|---|---|
| Gaussian | White noise, OFDM signal | 2 |
| Uniform | Quantization noise | 1.4 |
| Amplitude-modulated | 64 QAM | 1.38 |
| Amplitude-modulated | 16 QAM | 1.32 |
| Phase-modulated | BPSK, QPSK, 8-PSK | 1 |

Assuming α=2, a SEF can be simplified to $$SEF = Q\left(\sqrt{N_B} \frac{SNR}{SNR+2}\right) \quad (81)$$

Figure 9:
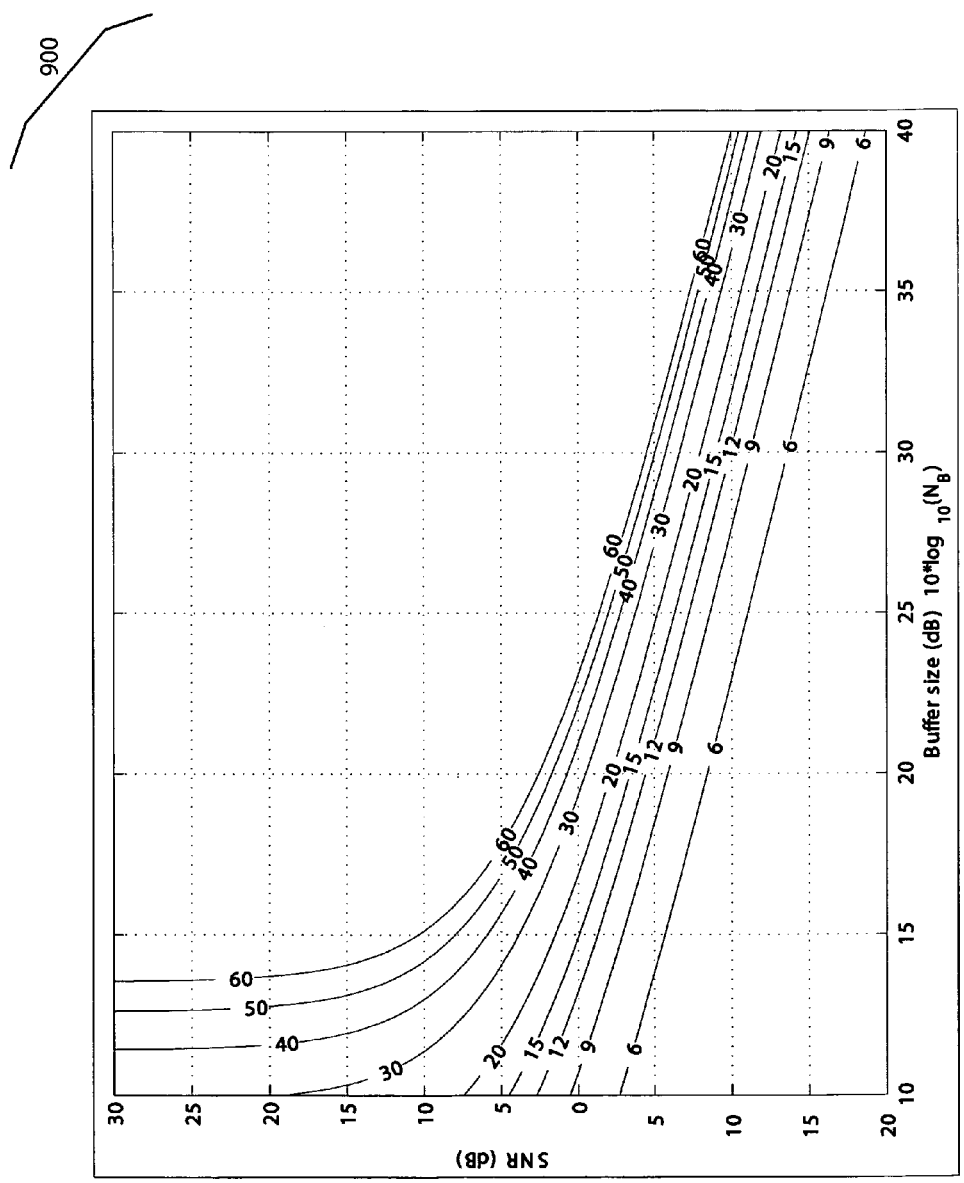
FIG. 9 graph: Sensing error floor contours

The graph 900 of FIG. 9 shows the sensing error floor contours at various SNRs and averaging buffer sizes. Note that the error floor is expressed in dB units, e.g. −20 dB corresponding to an SEF of 0.01. When SNR<<1, the argument of the Q function in equation (81) can be approximated as $$\sqrt{N_B} \frac{SNR}{2} \quad (82)$$

Thus, in some embodiments a linear decrease in SNR can be met by a quadratic increase in buffer size $N_B$ in order to maintain a specified SEF value. When SNR>>1, the argument of the Q function in equation (81) can be approximated as $\sqrt{N_B}$ independent of SNR.

Energy-Based Sensing:

Energy-based sensing is a generic sensing method that can apply to many classes of signals, since any information-bearing signals have essentially nonzero energy. Energy-based sensing can work well when a noise signal is far smaller in energy than a target signal. However, in some embodiments, the reliability of energy-based sensing can be significantly impaired when the target signal power approaches the noise floor. In addition, since energy sensing does not differentiate signal types, energy-based sensing can be susceptible to false detection, e.g. due to impulse noise and/or other types of radio activity.

In an embodiment of energy-based sensing, average signal power within a specified target channel can be computed. Signal power can then be compared to a noise floor and can be thresholded to determine signal presence. The computation can also lead to a channel SNR estimation that can be useful elsewhere.

Figure 21:
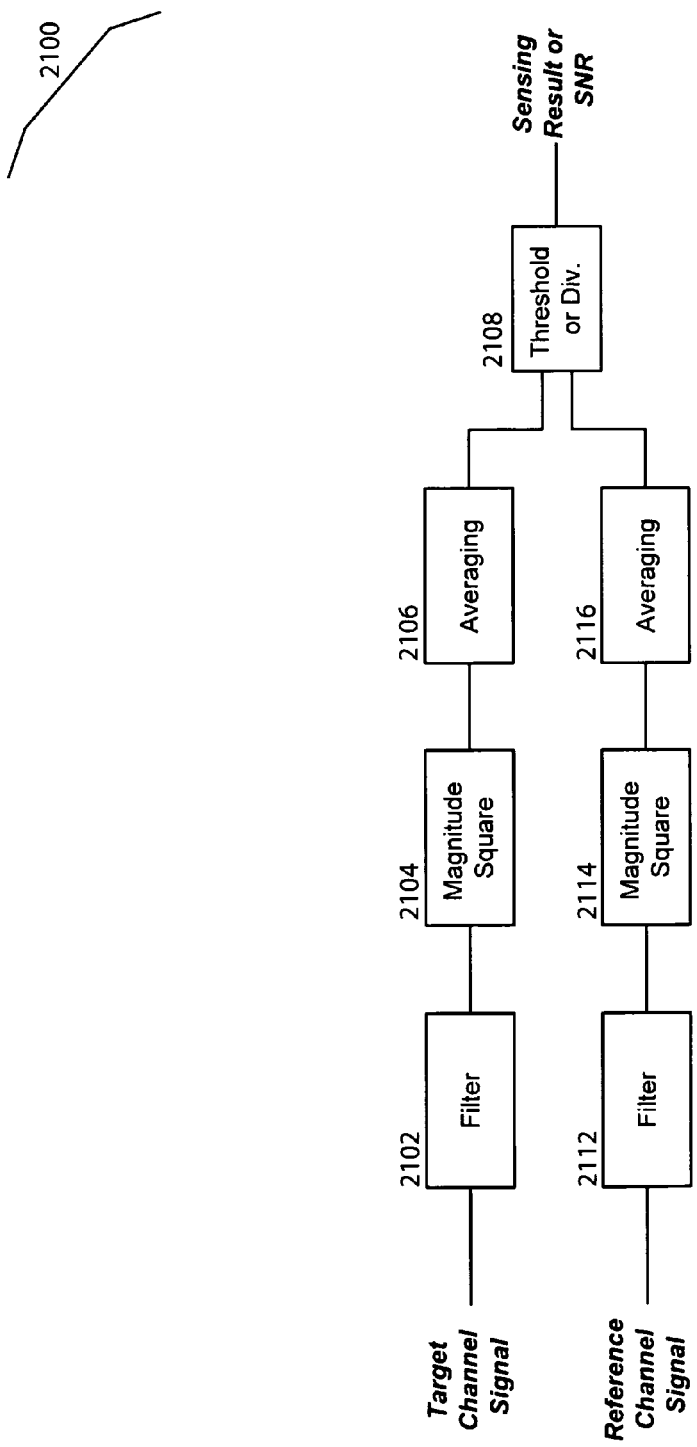
FIG. 21 diagram: Energy sensing

A block diagram 2100 for some embodiments of energy sensing is depicted in FIG. 21. The upper branch of the graph illustrates computation of signal power in a target channel. A filter block 2102 can essentially provide a significant information-bearing portion of signal spectrum while removing an unreliable portion of the signal spectrum (e.g. channel edges which can be contaminated by signal leakages from adjacent channels). For a signal after the filter y(n), a target channel signal power can be computed as:

$$P(n) = \frac{1}{N}\sum_{l=n-(N-1)}^{n} |y(l)|^2 \quad (83)$$

where N corresponds (again) to averaging depth. Equation (83) can be implemented by Magnitude Square 2104 and Averaging 2106 modules. Magnitude Square 2104 can perform a power computation function $|y(l)|^2$ as shown in Equation (83) and whose implementations are discussed herein. Averaging 2106 can perform an averaging function whose implementations are discussed herein and particularly regarding diagrams 1800.

A key part of an energy sensing algorithm can be computation of noise power. A target signal power can be compared against a computed noise power. For a TV signal, noise power can be computed using a reference channel that contains essentially no signal transmission. In the TV band, Channel 37 is typically reserved for astronomy observations; typically essentially no signal transmission occurs. This channel can be used as a reference channel. Signal power computation on the reference channel can be essentially the same as that for the target channel, as shown in the lower branch of the graph. The reference channel power can be computed as:

$$P_0(n) = \frac{1}{N}\sum_{l=n-(N-1)}^{n} |y_0(l)|^2 \quad (84)$$

where $y_0(n)$ is an input signal on the reference channel after filtering. A sensing decision can be made by comparing target channel signal power P(n) against the reference channel signal power $P_0(n)$ using a specified threshold. A signal-to-noise ratio can be computed as:

$$SNR(n) = \frac{P(n) - P_0(n)}{P_0(n)} \quad (85)$$

Threshold or Div. 2108 can provide a sensing result by comparing and/or thresholding the averaged power of a target channel signal (provided by Averaging 2106) with an averaged power of a reference channel. A signal processing chain comprising Filter 2112, Magnitude Square 2114, and Averaging 2116 can provide a static and/or a dynamic averaged power for a reference channel. A dynamic averaged power can also be otherwise specified and/or computed as discussed herein. Filter 2112 can provide filtering for a reference channel as Filter 2102 does for a target channel. Magnitude Square 2114 and Averaging 2116 modules can provide power computation and averaging to the reference channel signal path as are provided to the target channel signal path by the corresponding modules 2104 2106. In some embodiments Threshold or Div. 2108 module can provide a SNR result as specified in Equation (85).

System and Network Layer Analysis:

Some important system and network layer techniques are herein described that can be used in order to facilitate TV-band cognitive radio operation. For example, since TV receivers are typically passive, reactive interference control by detecting their presence is essentially not possible in some embodiments. Instead, a proactive approach can be taken through collective sensing by networked cognitive users in order to reduce interference in a statistical sense. To maximize the potential of cognitive user transmission while limiting adjacent channel interference to TV users, a cognitive user transmission power can be controlled adaptively based on signal power measurements of adjacent TV channels. A hidden terminal probability analysis can quantify a TV-band hidden terminal probability, and is described herein. Collective sensing can help reduce hidden terminal probability, and is described herein. Rate and range adaptation to optimize system throughput under various field conditions is described herein. Also herein described are embodiments of collective sensing and adaptive transmission power control in a TV-band cognitive radio system.

Hidden Terminal Probability Analysis

Instances of a hidden terminal can pose a significant challenge to some embodiments of a TV-band cognitive system. In a TV-band cognitive radio system, TV stations and TV receivers can be primary users. Since TV receivers typically do not transmit, detecting the presence of a TV receiver is not straightforward. The hidden terminal problem in a TV-band cognitive system can alternatively be addressed in a statistical fashion. First, the hidden terminal problem can be quantified in terms of a hidden terminal probability (HTP). A mechanism is herein described to then reduce hidden terminal probability through sensing information sharing amongst cognitive users; this approach is called collective sensing.

A uniform propagation loss model is described herein, wherein signal propagation loss can increase monotonically with distance. A case of shadowing is herein described, where propagation loss can depend on propagation distance and/or environmental attenuation.

Figure 10:
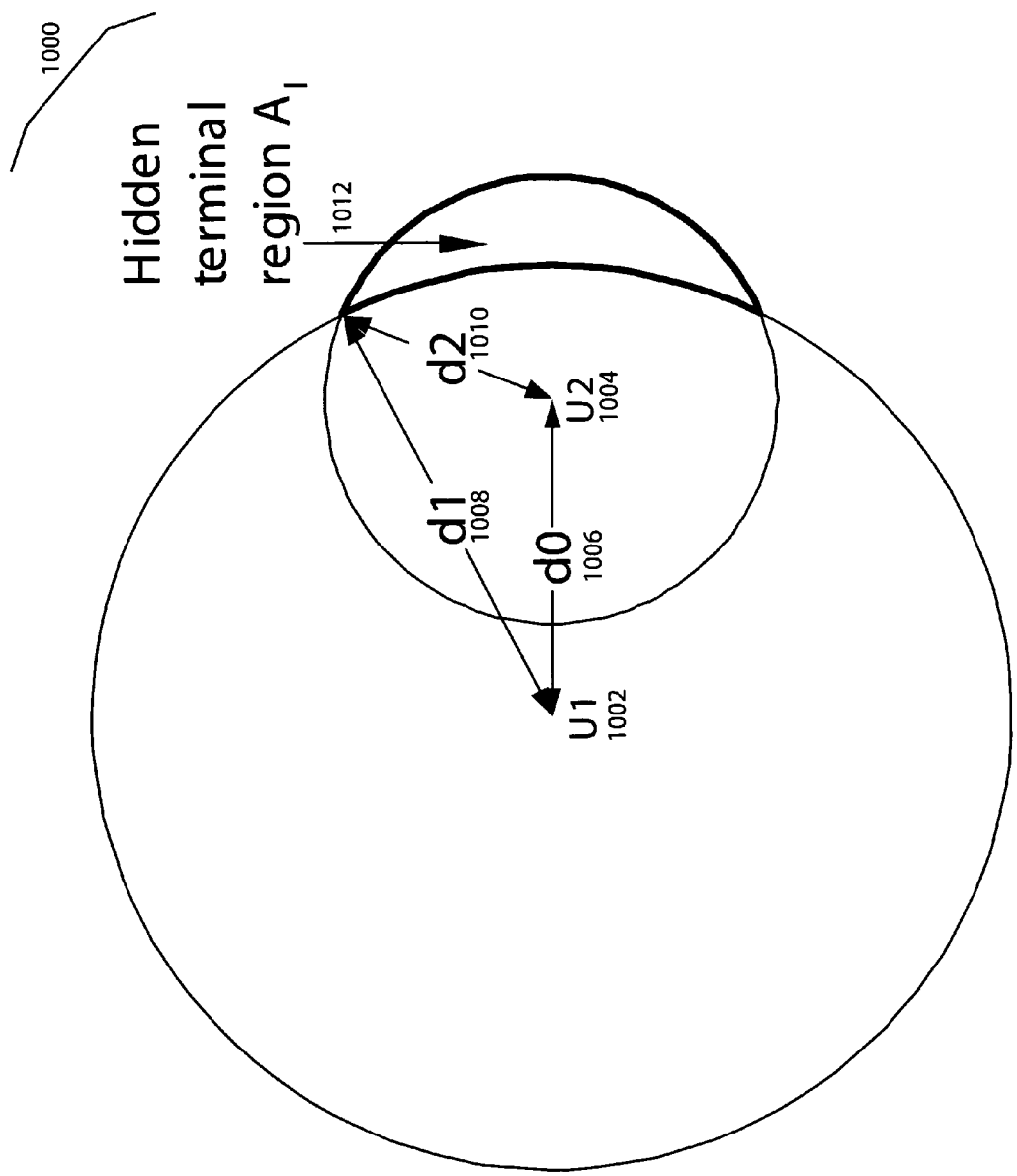
FIG. 10 diagram: hidden terminal problem.

HTP with No Shadowing:

A signal transmission from a primary user $U_1$ 1002 to another primary user $U_2$ 1004 in a propagation environment with uniform propagation loss is depicted in the diagram 1000 of FIG. 10. $d_0$ 1006 can represent a maximum distance within which a primary user can detect another primary user. $d_1$ 1008 can be a maximum distance within which a cognitive user can detect a primary user. $d_2$ 1010 can be a maximum distance within which a transmission from a cognitive user can be considered harmful to a primary user.

As depicted in the illustration, for a signal transmission from $U_1$ to $U_2$, a cognitive user who appears in the marked hidden terminal region $A_1$ 1012 cannot detect $U_1$ and can create harmful interference to $U_2$ upon choosing to transmit. A worst case interference, i.e. the largest $A_1$, can result when $U_2$ is at a maximum distance $d_0$ from $U_1$.

Assuming a cognitive user area density of $\rho$, the hidden terminal probability—the probability that at least one cognitive user appearing in the interference region $A_1$—can be expressed $$P_{HT} = 1 - e^{-\rho A_I} \qquad (86)$$

as derived herein. Referring to FIG. 10, in order to completely eliminate the interference can require that $$d_1 \geq d_0 + d_2 \qquad (87)$$

in which case $A_1 = 0$ and $P_{HT} = 0$.

In a log-distance path loss model [T. S. Rappaport, op. cit.], loss from a transmitter to a receiver at a distance r away can be expressed as $$\bar{L}(r) = K(r_0)\left(\frac{r}{r_0}\right)^\alpha \qquad (88)$$

Here $\alpha$ is the path loss exponent characteristic of the propagation environment; $r_0$ is the distance from the transmitter to a close-in reference point; and $K(r_0)$ is the loss from the transmitter to the reference point. For simplicity, the primary user and cognitive user can be assumed to have essentially the same $r_0$ and $K(r_0)$. It can be appreciated that such assumptions can effectively be equivalent to assuming that a TV station transmitter has the same elevation as a cognitive user transmitter. Under these assumptions, a TV signal path loss can be significantly overestimated.

Figure 11:
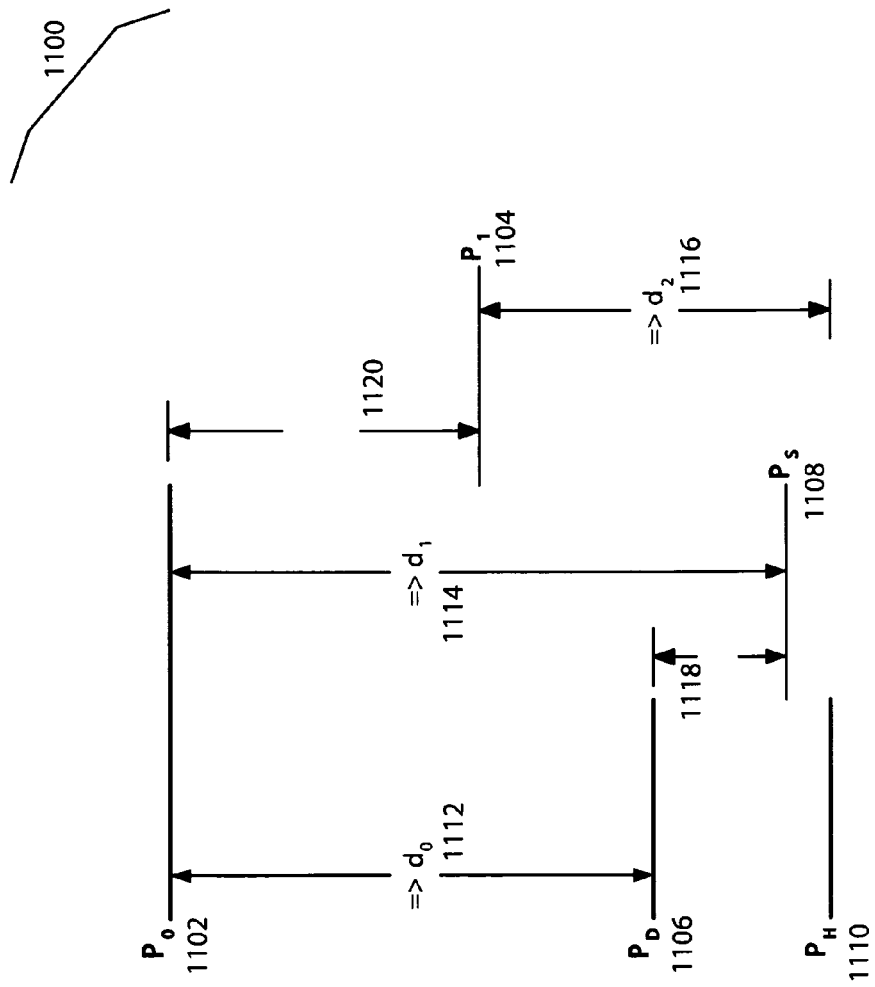
FIG. 11 diagram: relations between various signal power level definitions.

As illustrated in the diagram 1100 of FIG. 11, primary user transmission power is $P_0$ 1102; cognitive user transmission power is $P_1$ 1104; a primary user decoding threshold power is $P_D$ 1106; a cognitive user sensing power can be $P_S$ 1108; and a harmful interference threshold power level can be $P_H$ 1110. Since losses for the distances d0 d1 d2 (figure elements 1112 1114 1116, respectively) can be expressed:

$$\bar{L}(d_0) = P_0/P_D \qquad (89)$$

$$\bar{L}(d_1) = P_0/P_S \qquad (90)$$

$$\bar{L}(d_2) = P_1/P_H \qquad (91)$$

An interference free condition of Equation (87) can be restated as:

$$r_0\left[\frac{1}{K(r_0)}\frac{P_0}{P_S}\right]^{\frac{1}{\alpha}} \geq r_0\left[\frac{1}{K(r_0)}\frac{P_0}{P_D}\right]^{\frac{1}{\alpha}} + r_0\left[\frac{1}{K(r_0)}\frac{P_1}{P_H}\right]^{\frac{1}{\alpha}} \qquad (92)$$

$$\Rightarrow \left(\frac{P_D}{P_S}\right)^{\frac{1}{\alpha}} \geq 1 + \frac{\left(\frac{P_D}{P_H}\right)^{\frac{1}{\alpha}}}{\left(\frac{P_0}{P_1}\right)^{\frac{1}{\alpha}}}$$

Figure 12:
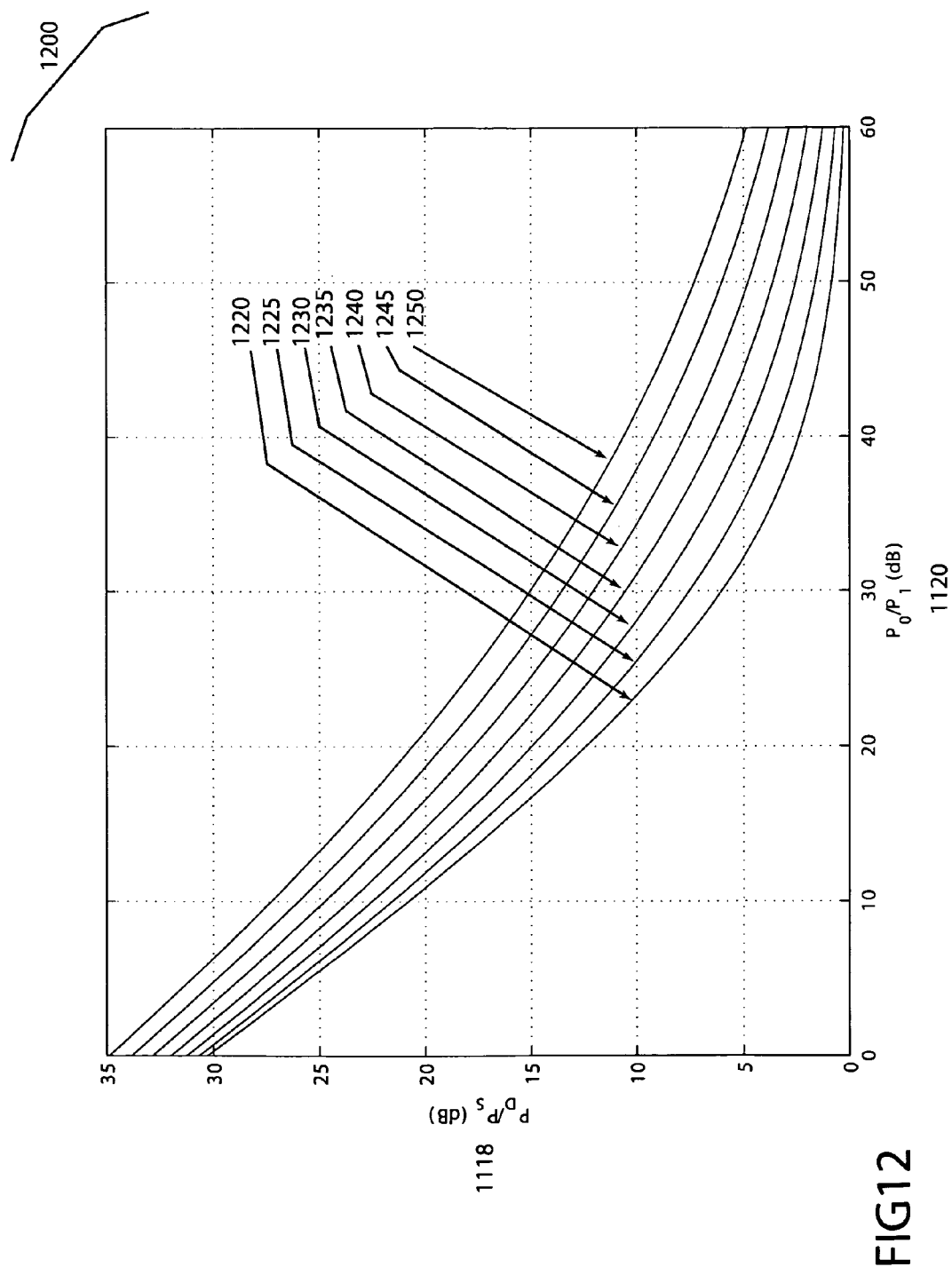
FIG. 12 graph: PD/PS and P0/P1 for interference-free operation

Note that a sensing gain 1118 $P_D/P_S$ can measure cognitive user sensing performance against primary user decoding performance. $P_0/P_1$ can be a measure of primary user and cognitive user transmission power difference 1120. The graph 1200 of FIG. 12 plots sensing gain $P_D/P_S$ 1118 values against transmission power difference $P_0/P_1$ 1120 required in order to achieve an interference-free condition of Equation (92), assuming that $P_D/P_H = 30$ dB. Curves 1220 1225 1230 1235 1240 1245 1250 are shown for path loss exponent $\alpha$ values of 2.0 2.5 3.0 3.5 4.0 4.5 5.0, respectively.

FIG. 12 illustrates an embodiment in which a typical TV station transmission power is approximately 100 kW and a cognitive user's maximum transmission power is approximately 1 W ($P_0/P_1 = 50$ dB). In some embodiments an 8 dB $P_D/P_S$ can ensure essentially interference-free operation under the conditions of typical path loss exponents.

HTP in Shadowing Environment:

A typical propagation environment can be non-uniform. Receivers disposed at essentially equivalent distances from a particular transmitter can simultaneously experience different received signal strengths from that transmitter. Variations can depend on signal paths between transmitter and receivers. This effect is called shadowing. The log-distance path loss of Equation (88) can be expressed in dB form $$\overline{L}^{dB}(r) = K^{dB}(r_0) - 10\alpha \log_{10} r_0 + 10\alpha \log_{10} r \quad (93)$$

and an actual loss at a particular receiver can be modeled as $$L^{dB}(r) = \overline{L}^{dB}(r) + X_\sigma^{dB} \quad (94)$$

where $\overline{L}^{dB}(r)$ is considered as an average path loss while a zero-mean Gaussian random variable $X_\sigma^{dB}$ with standard deviation $\sigma$ can account for the effect of shadowing [T. S. Rappaport, op. cit.].

Figure 13:
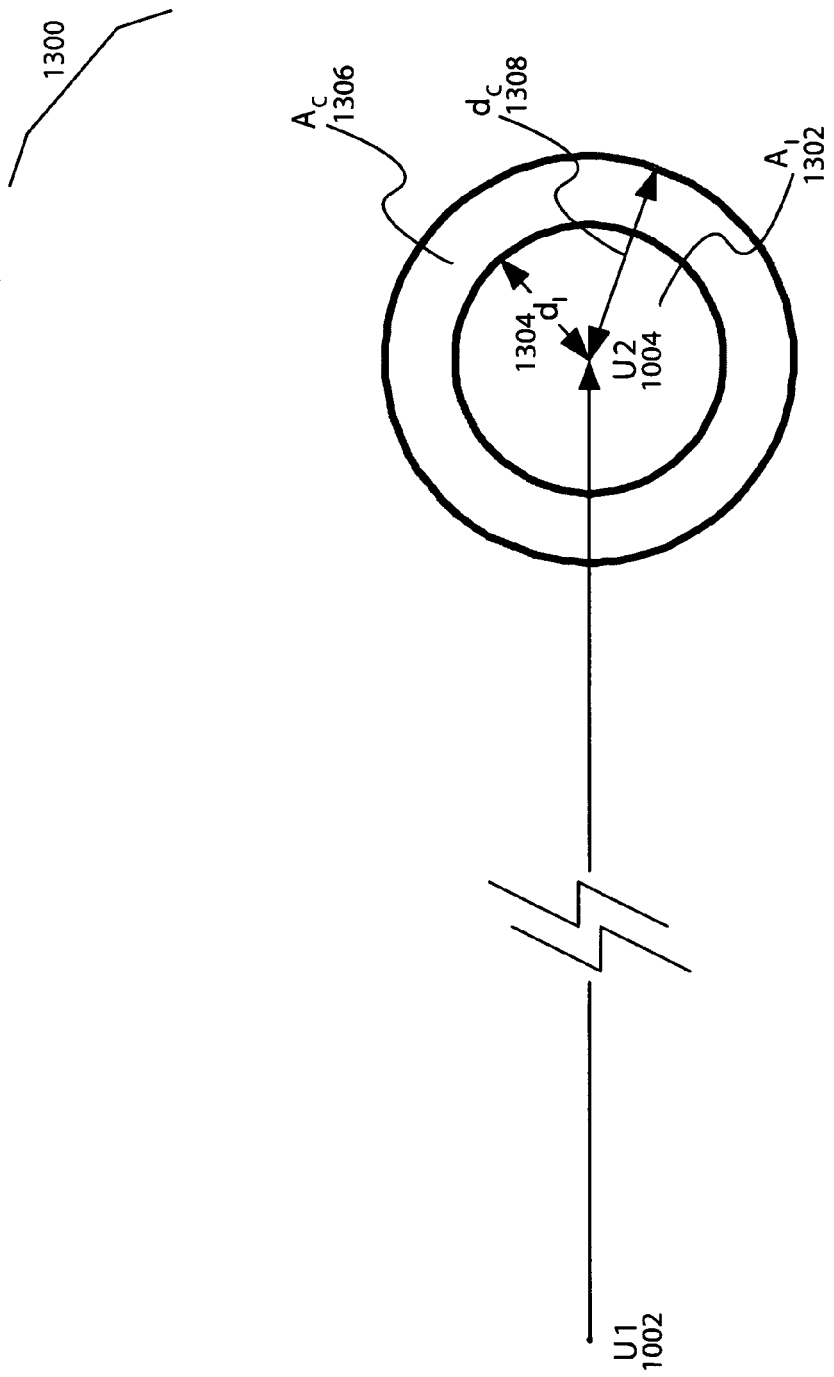
FIG. 13 diagram: hidden terminal problem in shadowing environment.

A signal transmission from primary user $U_1$ 1002 to primary user $U_2$ 1004 is depicted in the diagram 1300 of FIG. 13. Given a distance between $U_1$ and $U_2$ of r, a distance between a potentially interfering cognitive user and $U_2$ of $\Delta$, and a distance between $U_1$ and the cognitive user of r', it can follow that due to the transmission power difference between $U_1$ and the cognitive user, $r \gg \Delta$ and $$\overline{L}(r) \approx \overline{L}(r+\Delta) \geq \overline{L}(r') \geq \overline{L}(r) \Rightarrow \overline{L}(r') \approx \overline{L}(r) \quad (95)$$

In some embodiments a potentially interfering cognitive user can experience essentially the same path loss for a signal coming from $U_1$ as for a signal coming from $U_2$. In another case, $U_2$ can be at a cell edge, i.e. $r=d_0$. Signal path loss from $U_1$ to a cognitive user can then be expressed $$\overline{L}^{dB}(d_0) + X_\sigma^{dB} \quad (96)$$

Successful sensing of the signal by the cognitive user can require $$P_0^{dB} - [\overline{L}^{dB}(d_0) + X_\sigma^{dB}] > P_S^{dB} \Rightarrow X_\sigma^{dB} < P_D^{dB} - P_S^{dB}$$

with a sensing success probability of $$\Gamma = \frac{1}{\sqrt{2\pi}\,\sigma} \int_{-\infty}^{P_D^{dB}-P_S^{dB}} e^{-\frac{x^2}{2\sigma^2}} dx \quad (97)$$

($P_D$ and $P_S$ are in dB units and $\Gamma$ is a probability value between 0 and 1.) Because of shadowing, the interference region can extend beyond $d_2$ (from $U_2$), with interference probability decreasing with increasing distance from $U_2$. An effective interference region $A_1$ 1302 around $U_2$ can be assumed (for simplicity):

$$A_1 = \pi d_1^2 \quad (98)$$

noting that $d_1$ 1304 can be on the same order as $d_2$ for this assumption. A cognitive user that is located in effective interference region $A_1$ and that does not successfully sense a signal from $U_1$ can be identified as a hidden terminal.

Given cognitive user density $\rho$, sensing success probability $\Gamma$, and effective interference region $A_1$, a hidden terminal probability in the case of shadowing can be expressed $$P_{HT} = 1 - e^{-\rho A_1(1-\Gamma)} \quad (99)$$

as derived herein. For a resulting constant $A_1 = \pi d_1^2 \sim \pi d_2^2$, an essentially zero HTP thus corresponds to $\Gamma=1$. Such a constraint could require essentially infinite sensing gain $P_D/P_S$ to meet a specified performance criterion. For a finite $P_D/P_S$, HTP in Equation (99) is monotonic with cognitive user density $\rho$. As $\rho$ increases, HTP can exceed a tolerable specified performance level.

HTP with Sensing Information Sharing:

In some embodiments the above dilemma can result from sensing being performed by a lone local cognitive user. If a user happens to experience severe shadowing, the user may not be able to detect a primary user signal even with relatively large sensing gain. As cognitive user density increases, such a situation can become more likely and can result in increased interference to a primary user.

This system behavior can be addressed in some embodiments by employing sensing information sharing between cognitive users. As an increasing number of cognitive users share their sensing results, the probability of shadowing can be reduced exponentially, and hidden terminal probability can be similarly reduced. This approach can be called collective sensing by a cognitive user network.

Referring to FIG. 13, all cognitive users in an area $A_C$ 1306 around $U_2$ and defined by radius $d_C$ 1308, $$A_c = \pi d_C^2 \quad (100)$$

can share their sensing information so that a cognitive user located in $A_1$ 1302 transmits only under the condition that essentially none of the cognitive users in $A_C$ 1306 sense a signal from $U_1$ 1002. Assuming $A_C \geq A_1$, a hidden terminal probability can be expressed $$P_{HT} = e^{-\rho A_C \Gamma}[1 - e^{-\rho A_1(1-\Gamma)}] \quad (101)$$

as derived herein.

Figure 14:
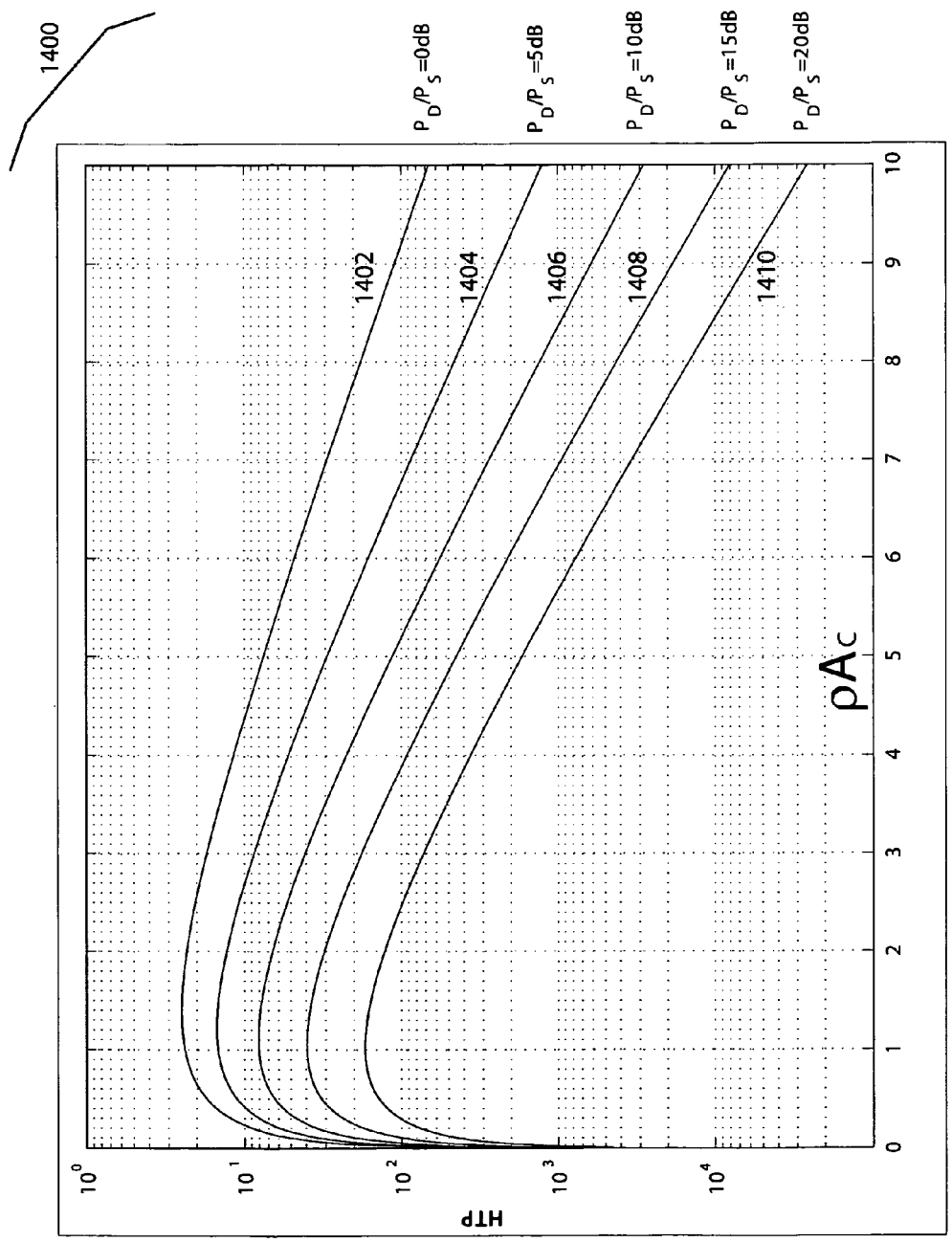
FIG. 14 graph: Hidden terminal probability with sensing information sharing

Comparing Equation (101) with Equation (99), the factor $e^{-\rho A_C \Gamma}$—a result of sensing information sharing—can help to drive down HTP as $\rho$ increases. This effect is shown in the graph 1400 of FIG. 14 under the assumption of $A_1 = A_C$. $\Gamma$ can be calculated using Equation (97); a shadowing environment can be characterized by using a random Gaussian variable $X_\sigma^{dB}$ with $\sigma=11.8$ dB based on an urban cellular measurement [T. S. Rappaport, op. cit.].

Graph 1400 depicts HTP value curves 1402, 1404, 1406, 1408, and 1410 corresponding to specified sensing gains of 0 dB, 5 dB, 10 dB, 15 dB, and 20 dB, respectively, varying with the quantity of cognitive users sharing information $\rho A_C$.

Figure 15:
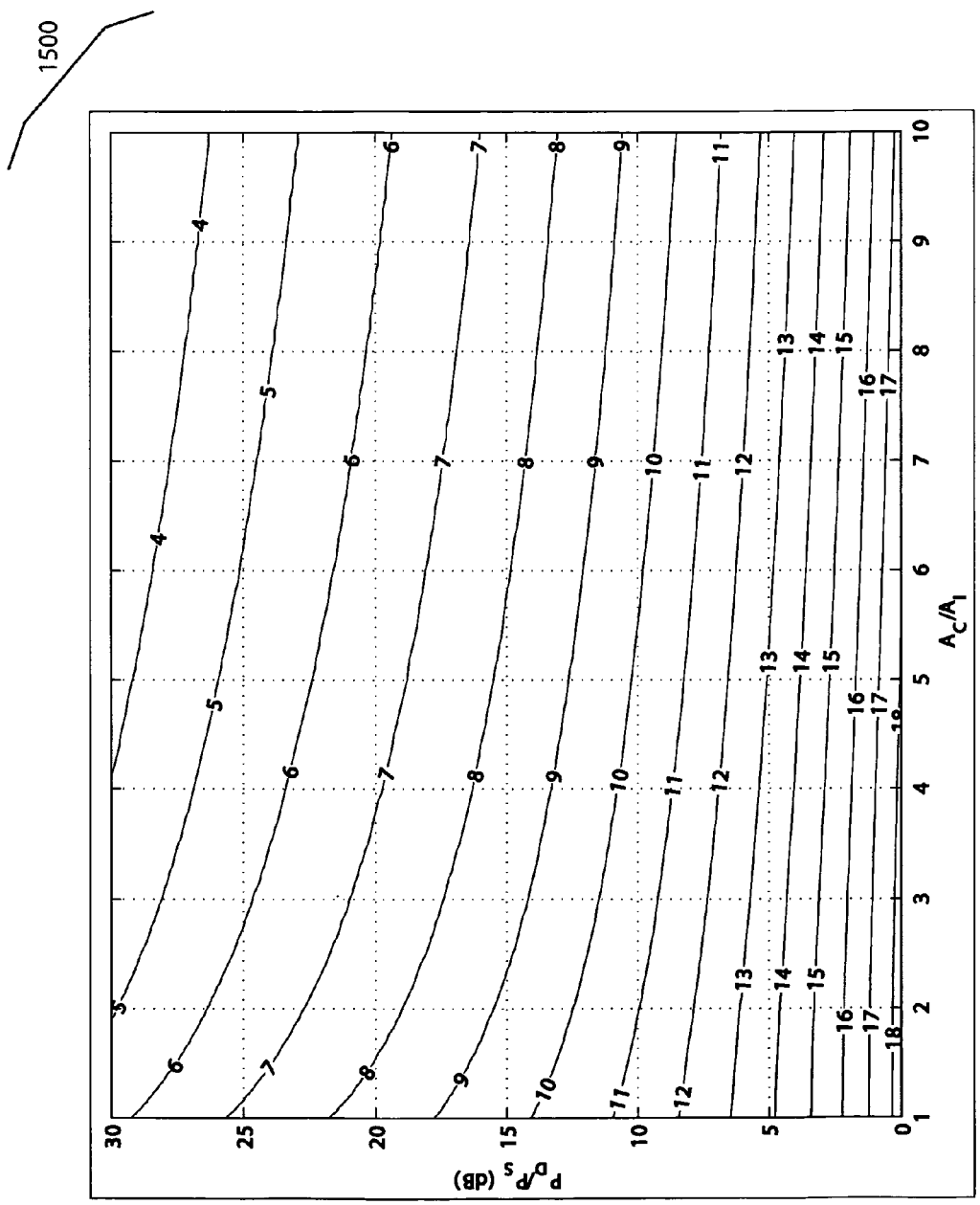
FIG. 15 graph: Critical mass for a specified HTP in a shadowing environment.

Graph 1400 shows that an arbitrarily low HTP can be achieved in some embodiments by enlisting an adequate number of cognitive users $\rho A_C$ in sharing their sensing information. A target HTP can be achieved by requiring a threshold number of cognitive user participants. This threshold can be called the critical mass of collective sensing. The critical mass $M_C$ of collective sensing, cognitive user participants can be defined as $$M_C = \rho A_C \quad (102)$$

such that Equation (101) achieves a predefined HTP. Graph 1500 of FIG. 15 depicts the $M_C$s required to achieve an HTP of $10^{-4}$ in a shadowing environment with $\sigma=11.8$ dB for varying values of sensing gain $P_D/P_S$ and area ratio $A_C/A_1$. For example, when $A_C/A_1=2$ and $P_D/P_S=10$ dB, a critical mass of 11 cognitive users can achieve a target HTP of $10^{-4}$.

Rate Coverage Area:

Supporting system rates as discussed above can require different SNRs. A coverage area (i.e. cell size) for a particular data rate can be defined as an area around a transmitter where a received signal SNR is above a required SNR level corresponding to the data rate.

A log-normal path loss model of Equation (88) can be used to calculate a coverage area. A cognitive transmitter can be assumed to have a clearance of 10 meters (noting the same clearance is used in the TV-band per the NPRM [FCC, May 2004, op. cit.]. Within the clearance distance, signal propagation can follow a free-space propagation model. Signal power at the edge of a clearance region can be calculated as $$P(r_0) = \left(\frac{c}{4\pi f r_0}\right)^2 P_{TX} \qquad (103)$$

which is also known as the Friis free-space equation [T. S. Rappaport, op. cit.], and where c is the speed of light. Signal power loss from a transmitter to an edge of the clearance region can be expressed $$K^{dB}(r_0) = P_{TX}^{dB} - P^{dB}(r_0) = 20\log_{10}\left(\frac{c}{4\pi f r_0}\right) \qquad (104)$$

For example, $K(r_0)$ is 48 dB if $r_0=10$ m and f=600 MHz. Signal propagation beyond the clearance region can follow a log-normal path loss model as shown in Equation (88), and signal power at a distance r away from the transmitter can be expressed $$P^{dB}(r) = P_{TX}^{dB} - K^{dB}(r_0) - \alpha(r^{dB} - r_0^{dB}) \qquad (105)$$

noting the distance is expressed in dB units as well. Successful reception can be achieved for signal power exceeding a threshold $V_T$. The coverage area radius can be expressed $$(r^{dB} - r_0^{dB}) = \frac{1}{\alpha}[P_{TX}^{dB} - K^{dB}(r_0) - V_T^{dB}] \qquad (106)$$

where a decoding threshold is expressed as $$V_T^{dB} = N_0^{dB} + NF + SNR_T^{dB}$$

and where $N_0=-106$ dBm is the thermal noise in a 6 MHz TV channel; NF is the receiver noise figure; and $SNR_T$ is the SNR threshold for successful decoding. SNR thresholds for various data rates are described previously.

Figure 16:
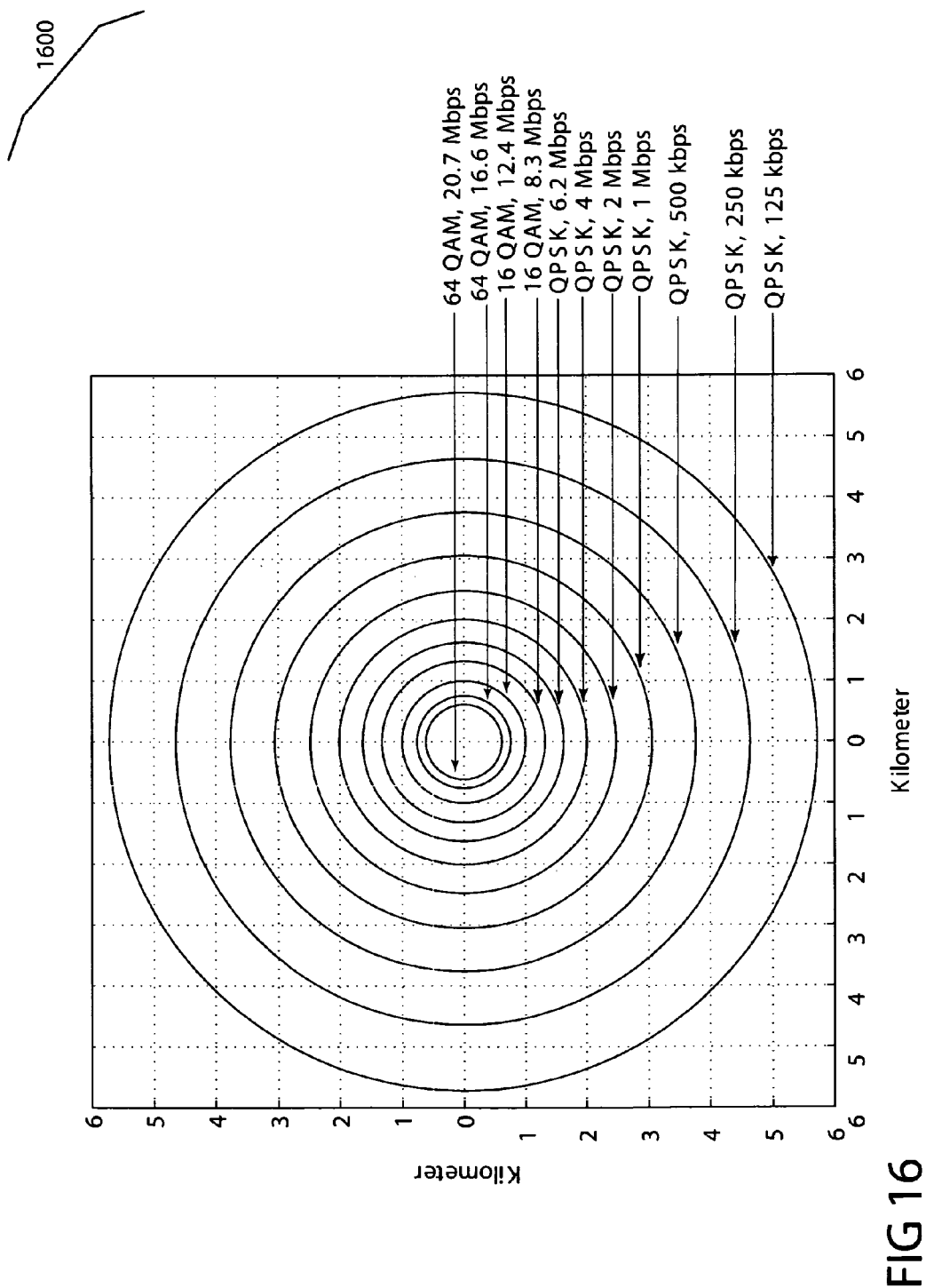
FIG. 16 radio signal coverage areas at different data rates.

Graph 1600 of FIG. 16 shows signal coverage areas at different data rates assuming a carrier frequency of 600 MHz, a clearance radius of 10 m, transmission power of 30 dBm (1 W), a path loss exponent $\alpha=3.3$, and a receiver noise figure of 8 dB. It can be appreciated that these coverage areas can be derived based on additive white gaussian channel (AWGN) SNRs and that areas can shrink if multipath margin is included in the SNRs. Notably, relative coverage area sizes can be independent of transmission power.

Collective Sensing:

Collective sensing can be key to reducing hidden terminal problems in a TV-band cognitive system as discussed herein. Collective sensing can be employed in some embodiments as described herein following.

Essentially all cognitive users considered in an embodiment can be required to periodically, e.g. every 10 seconds, broadcast their sensing results. A broadcast message from each cognitive user can include its SNR estimates and/or DTV and/or NTSC signal sensing outcomes on all TV channels. In some embodiments, such a broadcast message can be transmitted using a lowest data rate that has a largest coverage area, as shown in FIG. 16.

Each cognitive user in an embodiment can also "listen" to (receive and respond to) messages from potentially all of the other cognitive users in the embodiment. In order to transmit and/or otherwise use a TV channel, a cognitive user must collect negative sensing results on the target TV channel from at least $M_C$ cognitive users where $M_C$ is a critical mass corresponding to a specified level of hidden terminal probability as discussed regards Equation (102). For example, suppose a harmful interference level $P_H$ (as shown in FIG. 11) is at the noise floor. Since sensing results can be shared using the lowest data rate with a required SNR of −11 dB, an area ratio between the sensing result sharing region and potential interference region can be expressed as approximately $$A_C^{dB} - A_C^{dB} = 2(r_C^{dB} - r_1^{dB}) \approx 2 \cdot 10/3.3 = 6 dB \qquad (107)$$

corresponding to $A_C/A_1=4$ in linear scale. Using sensing methods as discussed herein, a sensing gain $P_D/P_S$ of 15 dB can be achieved. Referring to FIG. 15, a required critical mass for $10^{-4}$ HTP is then 9.

Figure 17:
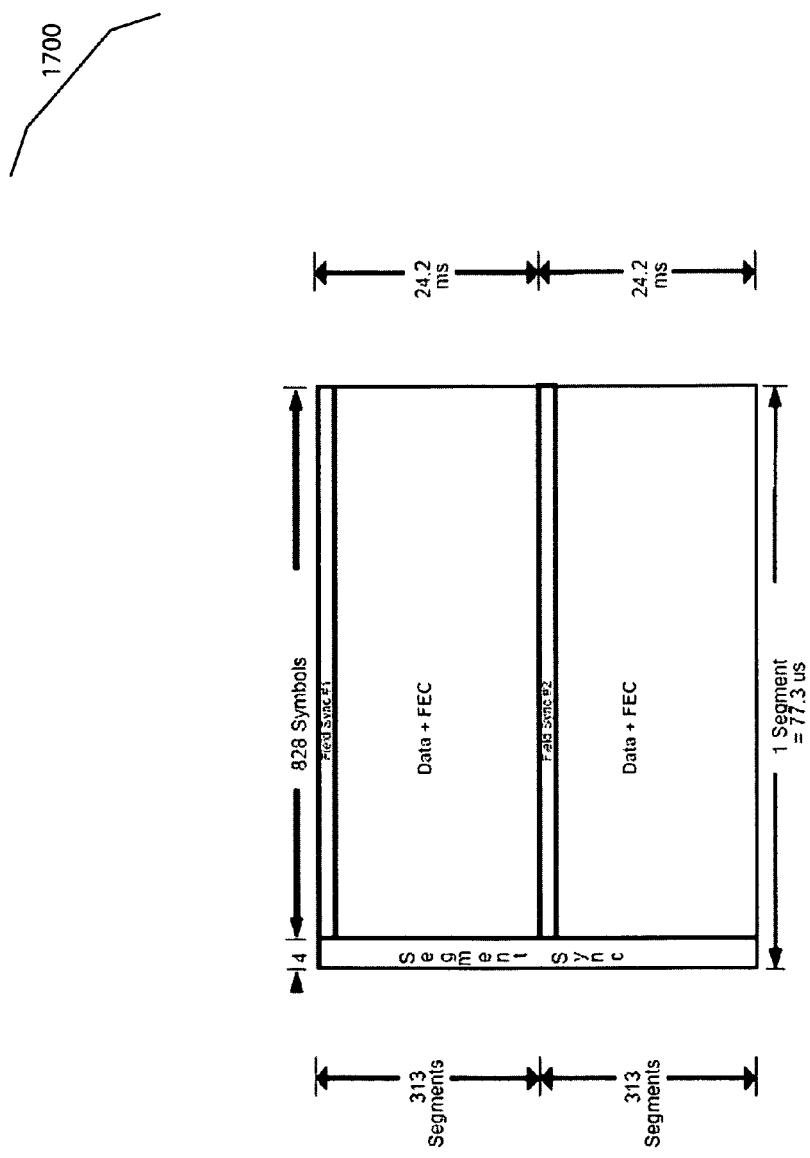
FIG. 17 ATSC Data Frame format

ATSC Signal Sensing: ATSC Frame Format:

An ATSC data transmission can be organized into Data Frames as shown in diagram 1700 of FIG. 17. Each Data Frame contains two Data Fields, each containing 313 Data Segments. The first Data Segment of each Data Field is a unique training sequence that can typically be used for channel equalization in a receiver.

The remaining 312 Data Segments carry data. Each Data Segment encodes a 188-byte transport stream packet and its associated 20 Reed Solomon FEC bytes. Each data segment consists of 832 8-VSB symbols and each symbol is a 8-level signal carrying 3 bits of information. The first 4 symbols of the Data Segment corresponding to the first (sync) byte of the 188-byte transport stream are transmitted in binary form and provide segment synchronization. The remaining 828 symbols can carry a total of 828*3=2484 bits of information. Since the symbols are 2/3 trellis coded, the equivalent number of data bits carried in the 828 symbols can be 2484*2/3=1656 or 207 data bytes, e.g. 187 transport stream bytes plus 20 RS FEC bytes. Notably, the first byte of a 188-byte transport packet is transmitted in the first 4 symbols of a Data Segment for segment sync.

Figure 20:
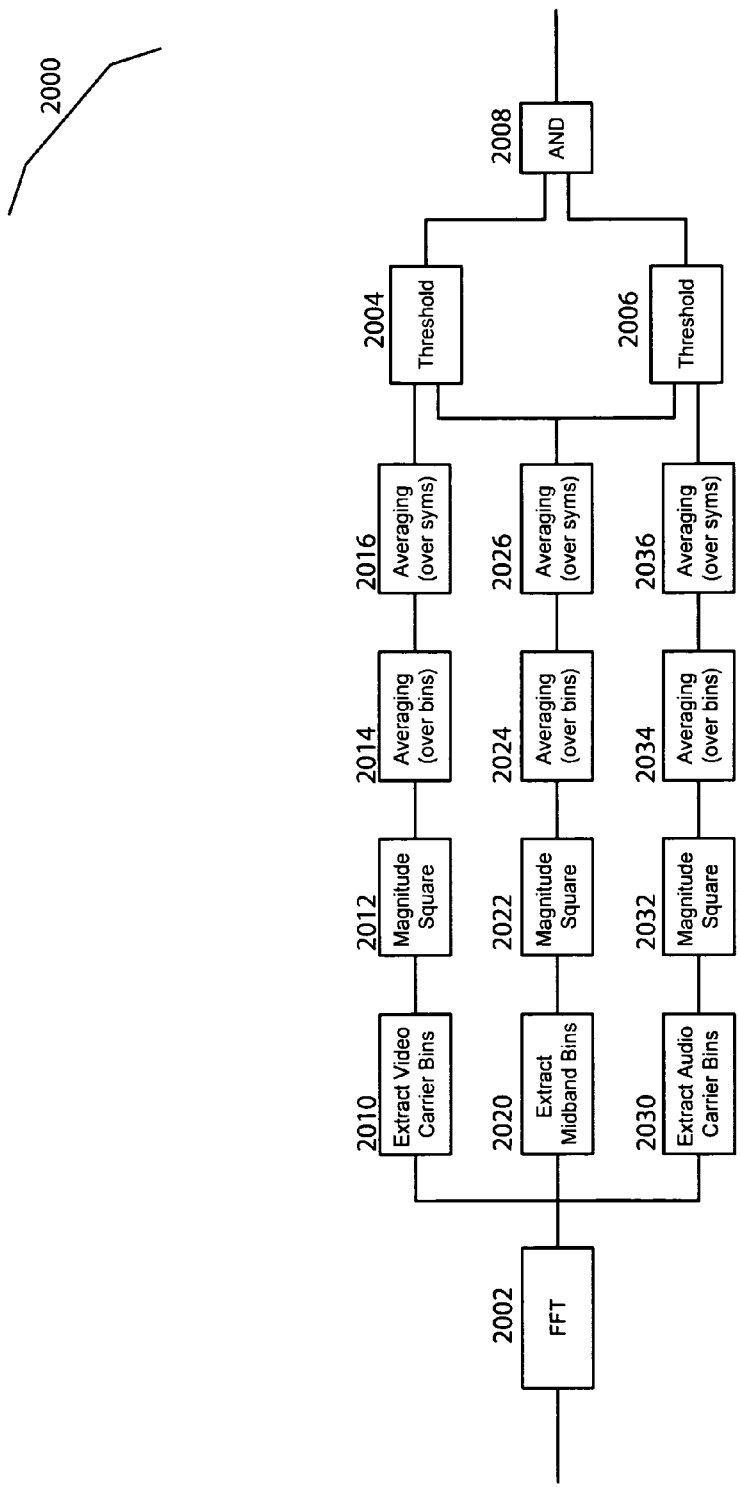
FIG. 20 diagram: NTSC signal sensing

NTSC Signal Sensing:

An NTSC (analog TV) signal can contain narrowband video, chroma, and audio carriers. These carriers can be at 1.25 MHz, 4.83 MHz, and 5.75 MHz from the left band edge, respectively. These relationships are illustrated in diagram 600 of FIG. 6. NTSC signal sensing can be based on detecting narrowband NTSC video and audio carriers. An FFT-based narrowband filter scheme can be used in order to detect video and audio carriers, as illustrated in diagram 2000 of FIG. 20.

A FFT size can be selected so as to be large enough to enable resolution of video and audio carriers. For example, for a 6 MHz TV channel, an FFT size of 256 or bigger can be used. As shown in diagram 2000, an input signal spectrum can be obtained by transforming a time-domain input signal to frequency domain using FFT. Bins around a video carrier can be extracted, and bins around an audio carrier can be extracted. Module FFT 2002 can perform an FFT operation on an input signal.

The number of bins taken for detecting the video and/or audio carriers can be specified, and can depend on channel bandwidth and FFT size. The number of bins taken can be specified to be large enough so that the probability of missing a target carrier is minimized. A missing carrier can occur if there is frequency offset between transmitter and receiver. For example, for a system that uses a 1024-point FFT over a 6 MHz channel bandwidth, the subcarrier spacing can be 5.86 kHz. It follows that in some embodiments of detection, 10 bins each around the video and audio carriers can be specified. Modules 2010 2020 2030 can be employed to extract video carrier, midband, and audio carrier bins, respectively.

In order to detect either video or audio carriers, power on each extracted bin can be evaluated, and an average over the bins taken. Magnitude Square modules 2012 2022 2032 can provide a magnitude-squared-based power measurement for video carrier, midband, and audio carrier signals, respectively. The power measurements can be bin-averaged by Averaging (over bins) modules 2014 2024 2034 (again respectively). The resulting bin-averaged power(s) can each be averaged again over a predefined number of symbols, e.g. 10, in order to improve sensing reliability. The bin-averaged power measurements can be symbol-averaged by Averaging (over symbols) modules 2016 2026 2036 (again respectively). Averaging processes can use implementations discussed herein and/or any other known and/or convenient averaging technique. In some embodiments, for averaging over a small number of elements, a running sum approach can be advantageously employed.

Averaged video and audio carrier powers can be appropriately normalized before thresholding for detection. An average power over bins in the center of a TV channel can be used as a basis for normalization, based on FIG. 6. According to FIG. 6, bins in the center of a TV channel can be relatively free of narrowband carriers, and, their average power can be a relatively accurate reflection of average power over the whole channel. Video and audio carrier powers can be expected to exceed average power over mid-band bins by a margin. The margin value can, by way of non-limiting example, be 10 dB. Further, comparing normalized video and audio carriers with such a threshold can enable a determination of the presence of a NTSC signal. If the video and audio carriers each exceed such a threshold, a positive NTSC signal detection result can apply. If the carriers do not exceed a threshold, a negative NTSC signal detection result can apply. A threshold 2004 module can perform a comparison between video carrier power and midband power, providing a NTSC signal detection result to an AND 2008 module. A threshold 2006 module can perform a a comparison between audio carrier power and midband power, providing a NTSC signal detection result to an AND 2008 module. An AND 2008 module can be employed to logically combine the result of signal detection results from threshold 2004 and threshold 2006 in order to provide a combined NTSC signal detection result. An AND 2008 module can perform specified logic and/or other operations (such as time-based operations) on provided input results in order to provide one or more combined results.

Figure 22:
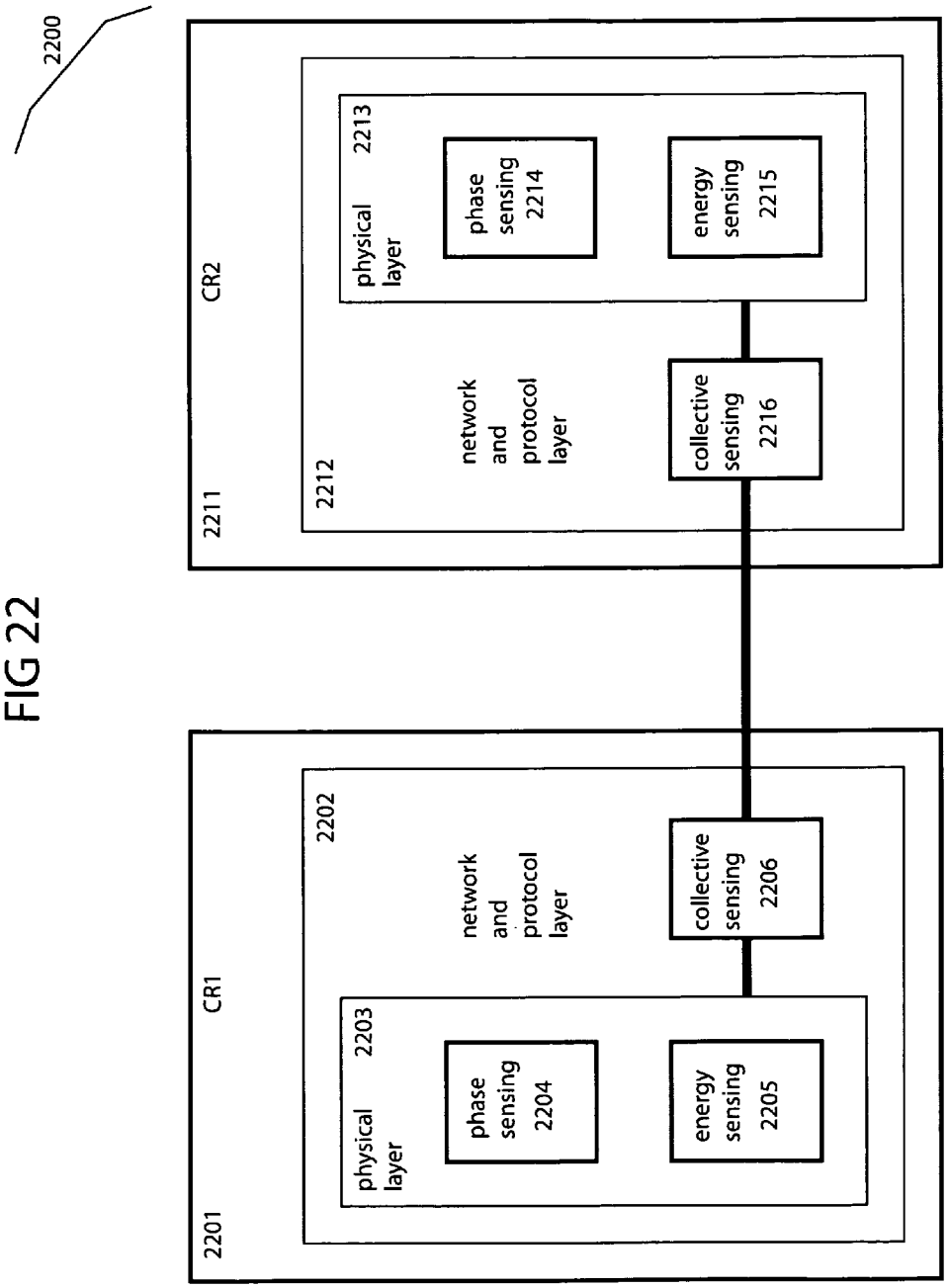
FIG. 22 diagram: Combined sensing methods

Diagram 2200 of FIG. 22 depicts some embodiments of combined sensing methods for cognitive radio.

A cognitive radio unit CR 2201 can comprise a phase sensing element 2204, an energy sensing element 2205, and a collective sensing element 2206. Phase sensing element 2204 and energy sensing element 2205 can be adapted to provide sensing functions as discussed herein, employing phase sensing techniques and energy sensing techniques, respectively. Phase sensing element 2204 and energy sensing element 2205 can be adapted to communicate and/or cooperate with each other, that is, interoperate, according to a specified physical layer 2203. A cognitive radio unit CR 2201 can further comprise a collective sensing element 2206. A collective sensing element 2206 can interoperate with other sensing elements according to a specified network and protocol layer 2202. As depicted in Diagram 2200, phase sensing 2204 and/or energy sensing 2205 elements can also interoperate with other sensing elements according to a specified network and protocol layer 2202.

As illustrated in Diagram 2200, a second cognitive radio unit CR 2211 can be substantially similar in architecture to CR 2201. CR 2211 can comprise a phase sensing element 2214, an energy sensing element 2215, and a collective sensing element 2216. Phase sensing element 2214 and energy sensing element 2215 can be adapted to interoperate according to a specified physical layer 2213. A collective sensing element 2216 can interoperate with other sensing elements according to a specified network and protocol layer 2212. Phase sensing 2214 and/or energy sensing 2215 elements can also interoperate with other sensing elements according to a specified network and protocol layer 2212.

Sensing elements in a first cognitive radio unit CR1 2201 can interoperate with sensing elements in a second cognitive radio unit CR2 2211 according to one or more specified network and protocol layers. In some embodiments, a specified network and protocol layer 2202 can be the same network and protocol layer 2212.

Physical layer sensing can comprise phase sensing and/or energy sensing. In some embodiments physical layer sensing can be advantageously combined with collective sensing, through utilization of network and protocol layer(s).

Sensing decisions for individual and/or multiple cognitive radio units 2201 2211 can be determined collectively through combining physical layer sensing results from a plurality of nearby cognitive radio units. In some embodiments, a collective sensing result can be determined as a weighted average of physical layer sensing results from nearby cognitive radio units. A weighting for a physical layer sensing result can be based on a specified and/or measured distance between a cognitive radio unit and another cognitive radio unit and/or a specified location; a specified location can be the location of a physical layer sensing process. That is, in some embodiments a weighting can be responsive to measured and/or specified locations and/or distances: between cognitive radio units, between a cognitive radio unit and a specified location, and/or between specified locations. In some embodiments, a distance metric can be based on a measurement of radio signal strength detected from a specified cognitive radio unit.

By way of non-limiting examples, communications for collective sensing and between two or more cognitive radio units 2201 2211 can be achieved through one or more of a specified cognitive radio channel, a cellular link, a WiFi link, an Ethernet link, and/or any other known and/or convenient wired and/or wireless communication systems. By way of non-limiting examples, such communications can be adapted for a wide-area network (WAN) and/or any other known and/or convenient technology for network communications.

Hidden Terminal Probability Derivations:

Hidden Terminal Probability:

A large number $N_\infty$ of cognitive users can be assumed to be randomly distributed over a large area $A_\infty$, covering the area of interest A. The probability of no user appearing in A, i.e. all users appearing outside A, can be expressed:

$$P_0(A) = \left(1 - \frac{A}{A_\infty}\right)^{N_\infty} \quad (108)$$
$$= \left[\left(1 - \frac{A}{A_\infty}\right)^{\frac{A_\infty}{A}}\right]^{\frac{N_\infty}{A_\infty}A}$$
$$= e^{-\rho A}$$

where $$\rho = \frac{N_\infty}{A_\infty}$$

is the cognitive user area density. The probability of one or more cognitive users appearing in A is $$P_{1+}(A) = 1 - P_0(A) = 1 - e^{-\rho A} \qquad (109)$$

The probability of k users appearing in A can be calculated as $$P_k(A) = \binom{N_\infty}{k}\left(\frac{A}{A_\infty}\right)^k\left(1 - \frac{A}{A_\infty}\right)^{N_\infty - k} \qquad (110)$$

$$= \frac{A^k}{k!}\underbrace{\left[\frac{N_\infty}{A_\infty}\frac{N_\infty - 1}{A_\infty}\cdots\frac{N_\infty - (k-1)}{A_\infty}\right]}_{\to \rho^k}$$

$$\underbrace{\left(1 - \frac{A}{A_\infty}\right)^{N_\infty}\left(1 - \frac{A}{A_\infty}\right)^{-k}}_{\to 1}$$

$$= \frac{(\rho A)^k}{k!}e^{-\rho A}$$

HTP in Shadowing Environment:

The probability that k users appear in an effective interference region $A_1$ can be expressed $$\frac{(\rho A_I)^k}{k!}e^{-\rho A_I} \qquad (111)$$

The probability that all k users have successfully sensed the signal from $U_1$ can be expressed as $$\Gamma^k \qquad (112)$$

The probability that at least one user has not successfully sensed the signal from $U_1$ can be expressed as $$1 - \Gamma^k \qquad (113)$$

This can represent an interference probability, given k users are inside the interference region $A_1$. An overall HTP can then be expressed $$\sum_{k=1}^{\infty}\left[\frac{(\rho A_I)^k}{k!}e^{-\rho A_I}\right](1 - \Gamma^k) = e^{-\rho A_I}\left[\sum_{k=1}^{\infty}\frac{(\rho A_I)^k}{k!} - \frac{(\rho A_I \Gamma)^k}{k!}\right] \qquad (114)$$

$$= e^{-\rho A_I}[e^{\rho A_I} - 1 - (e^{\rho A_I \Gamma} - 1)]$$

$$= 1 - e^{-\rho A_I(1-\Gamma)}$$

HTP with Sensing Information Sharing:

For any k users appearing in $A_1$, interference can occur when all k users are not sensing a signal from $U_1$, in combination with all users appearing in the area $A_C$-$A_1$ not sensing a signal from $U_1$. The total HTP can be expressed $$\sum_{k=1}^{\infty}\frac{(\rho A_I)^k}{k!}e^{-\rho A_I}(1-\Gamma)^k\left\{\sum_{l=0}^{\infty}\frac{[\rho(A_C - A_I)]^l}{l!}e^{-\rho(A_C-A_I)}(1-\Gamma)^l\right\} = \qquad (115)$$

-continued $$\sum_{k=1}^{\infty}\frac{(\rho A_I)^k}{k!}e^{-\rho A_I}(1-\Gamma)^k\{e^{-\rho(A_C-A_I)}e^{\rho(A_C-A_I)(1-\Gamma)}\} =$$

$$e^{-\rho(A_C-A_I)\Gamma}e^{-\rho A_I}\sum_{k=1}^{\infty}\frac{(\rho A_I)^k}{k!}(1-\Gamma)^k =$$

$$e^{-\rho A_C \Gamma}e^{-\rho A_I(1-\Gamma)}[e^{\rho A_I(1-\Gamma)} - 1] = e^{-\rho A_C \Gamma}[1 - e^{-\rho A_I(1-\Gamma)}]$$

In the foregoing specification, the embodiments have been described with reference to specific elements thereof. It will, however, be evident that various modifications and changes may be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. For example, specific reference to NTSC and/or ATSC and/or DTV embodiments are provided by way of non-limiting examples. Systems and methods herein described can be applicable to any other known and/or convenient channel-based communication embodiments; these can comprise single and/or multiple carriers per channel and can comprise a variety of specified channel bandwidths. The specification and drawings are, accordingly, to be regarded in an illustrative rather than restrictive sense.

What is claimed is:

1. A method for sensing for cognitive radio comprising the steps of:
   receiving a first specified target signal;
   performing one or more first specified energy sensing functions,
      wherein the one or more first specified energy sensing functions are at least partially responsive to the first specified target signal;
   performing one or more first specified phase sensing functions,
      wherein the one or more first specified phase sensing functions are at least partially responsive to the first specified target signal;
   determining a first sensing result,
      wherein the first sensing result is at least partially responsive to the one or more first specified energy sensing functions and at least partially responsive to the one or more first specified phase sensing functions;
   performing one or more first specified collective sensing functions,
      wherein the one or more first specified collective sensing functions are at least partially responsive to the first specified target signal; and,
   determining a first combined sensing result,
      wherein the first combined sensing result is at least partially responsive to the one or more first specified energy sensing functions and at least partially responsive to the one or more first specified phase sensing functions and at least partially responsive to the one or more first specified collective sensing functions.

2. The method of claim 1 further comprising the steps of:
   receiving a second specified target signal;
   performing one or more second specified energy sensing functions, wherein the one or more second specified energy sensing functions are at least partially responsive to the second specified target signal;

performing one or more second specified phase sensing functions, wherein the one or more second specified phase sensing functions are at least partially responsive to the second specified target signal; and, determining a second sensing result, wherein the second sensing result is at least partially responsive to the one or more second specified energy sensing functions and at least partially responsive to the one or more second specified phase sensing functions.

3. The method of claim 2 further comprising the steps of:

performing one or more second specified collective sensing functions, wherein the one or more second specified collective sensing functions are at least partially responsive to the second specified target signal; and, determining a second combined sensing result, wherein the second combined sensing result is at least partially responsive to the one or more second specified energy sensing functions and at least partially responsive to the one or more second specified phase sensing functions and at least partially responsive to the one or more second specified collective sensing functions.

4. The method of claim 3 further comprising the step of:

determining a first collective sensing result, wherein the first collective sensing result at least partially responsive to the one or more first specified collective sensing functions and at least partially responsive to the one or more second specified collective sensing functions.

5. A system for sensing for cognitive radio comprising:

a first cognitive radio unit comprising:

a first energy sensing element, wherein the first energy sensing element provides one or more first specified energy sensing functions, and, wherein the one or more first specified energy sensing functions are at least partially responsive to a first specified target signal; and, a first phase sensing element, wherein the first phase sensing element provides one or more first specified phase sensing functions, and, wherein the one or more first specified phase sensing functions are at least partially responsive to the first specified target signal;

wherein the first cognitive radio unit provides a first sensing result at least partially responsive to the one or more first specified energy sensing functions and at least partially responsive to the one or more first specified phase sensing functions;

a first collective sensing element;

wherein the first collective sensing element provides one or more first specified collective sensing functions;

wherein the one or more first specified collective sensing functions are at least partially responsive to the first specified target signal; and, wherein the first cognitive radio unit provides a first combined sensing result at least partially responsive to the one or more first specified energy sensing functions and at least partially responsive to the one or more first specified phase sensing functions and at least partially responsive to the one or more first specified collective sensing functions.

6. The system of claim 5 further comprising:

a second cognitive radio unit comprising:

a second energy sensing element, wherein the second energy sensing element provides one or more second specified energy sensing functions, wherein the one or more second specified energy sensing functions are at least partially responsive to a second specified target signal; and, a second phase sensing element, wherein the second phase sensing element provides one or more second specified phase sensing functions, and, wherein the one or more second specified phase sensing functions are at least partially responsive to the second specified target signal; and, wherein the second cognitive radio unit provides a second sensing result at least partially responsive to the one or more second specified energy sensing functions and at least partially responsive to the one or more second specified phase sensing functions.

7. The system of claim 6 further comprising:

a second collective sensing element;

wherein the second collective sensing element provides one or more second specified collective sensing functions;

wherein the one or more second specified collective sensing functions are at least partially responsive to the second specified target signal; and, wherein the second cognitive radio unit provides a second combined sensing result at least partially responsive to the one or more second specified energy sensing functions and at least partially responsive to the one or more second specified phase sensing functions and at least partially responsive to the one or more second specified collective sensing functions; and, wherein the system provides interoperation between two or more of the first energy sensing element, the first phase sensing element, the first collective sensing element, the second energy sensing element, the second phase sensing element, and the second collective sensing element.

8. The system of claim 7 wherein:

the first cognitive radio unit provides a first collective sensing result at least partially responsive to the one or more first specified collective sensing functions and at least partially responsive to the one or more second specified collective sensing functions.

* * * * *